(12) United States Patent
Chen et al.

(10) Patent No.: US 6,570,510 B2
(45) Date of Patent: May 27, 2003

(54) DIGITAL IMAGE COMPRESSION AND DECOMPRESSION

(75) Inventors: Yu-Ling Chen, Epping (AU); James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/003,098

(22) Filed: Dec. 6, 2001

(65) Prior Publication Data

US 2002/0084921 A1 Jul. 4, 2002

(30) Foreign Application Priority Data

Dec. 6, 2000 (AU) .............................................. PR1928

(51) Int. Cl.[7] .............................................. H03M 7/34
(52) U.S. Cl. ........................................................ 341/51
(58) Field of Search ..................... 341/51, 50; 382/232, 382/250, 248

(56) References Cited

U.S. PATENT DOCUMENTS

| 6,016,360 | A | * | 1/2000 | Nguyen ........................ 341/51 |
| 6,246,798 | B1 | | 6/2001 | Andrew et al. ............. 382/240 |
| 6,259,819 | B1 | | 7/2001 | Andrew et al. ............. 382/248 |
| 6,263,110 | B1 | | 7/2001 | Andrew et al. ............. 382/232 |
| 6,266,414 | B1 | | 7/2001 | Bradley et al. ............. 380/240 |
| 6,351,568 | B1 | | 2/2002 | Andrew ...................... 382/239 |
| 6,420,979 | B1 | * | 7/2002 | Katayama .................... 341/51 |

FOREIGN PATENT DOCUMENTS

WO    WO 00/59231    10/2000    ............. H04N/7/26

* cited by examiner

Primary Examiner—Brian Young
(74) Attorney, Agent, or Firm—Fitzpatrick, Cella, Harper & Scinto

(57) ABSTRACT

The apparatus comprises a discrete wavelet transform (DWT) engine, a code block manager, and an entropy encoder. The code block manager comprises at least one controller, which losslessly compresses the transform coefficients and stores them in a code block storage for buffering. The entropy coder comprises at least one entropy encoder, each comprising a decoder for decoding the losslessly compressed transformed coefficients prior to entropy encoding.

45 Claims, 15 Drawing Sheets

| $S_i[m-1,n-1]$ | $S_i[m-1,n]$ | $S_i[m-1,n+1]$ |
|---|---|---|
| $S_i[m,n-1]$ | "X[m,n]" | $S_i[m,n+1]$ |
| $S_i[m+1,n-1]$ | $S_i[m+1,n]$ | $S_i[m+1,n+1]$ |

Fig. 1

| 1 | 5 | 9 | 13 | 17 | 21 | 25 | 29 |
|---|---|---|---|---|---|---|---|
| 2 | 6 | 10 | 14 | 18 | 22 | 26 | 30 |
| 3 | 7 | 11 | 15 | 19 | 23 | 27 | 31 |
| 4 | 8 | 12 | 16 | 20 | 24 | 28 | 32 |
| 33 | 37 | 41 | 45 | 49 | 53 | 57 | 61 |
| 34 | 38 | 42 | 46 | 50 | 54 | 58 | 62 |
| 35 | 39 | 43 | 47 | 51 | 55 | 59 | 63 |
| 36 | 40 | 44 | 48 | 52 | 56 | 60 | 64 |

Fig. 2

| Word0 | Word1 | Word2 | Word3 | Word4 |
|---|---|---|---|---|
| 4 | 2 | 2 | 1 | 1 |
| | 1 | 0 | 1 | 2 |
| | 0 | 0 | 1 | 1 |
| | 0 | 0 | 1 | 1 |
| | 1 | 1 | 1 | 1 |
| | 2 | 1 | 1 | 2 |
| | 0 | 0 | 1 | 4 |
| | 0 | 0 | 2 | 3 |

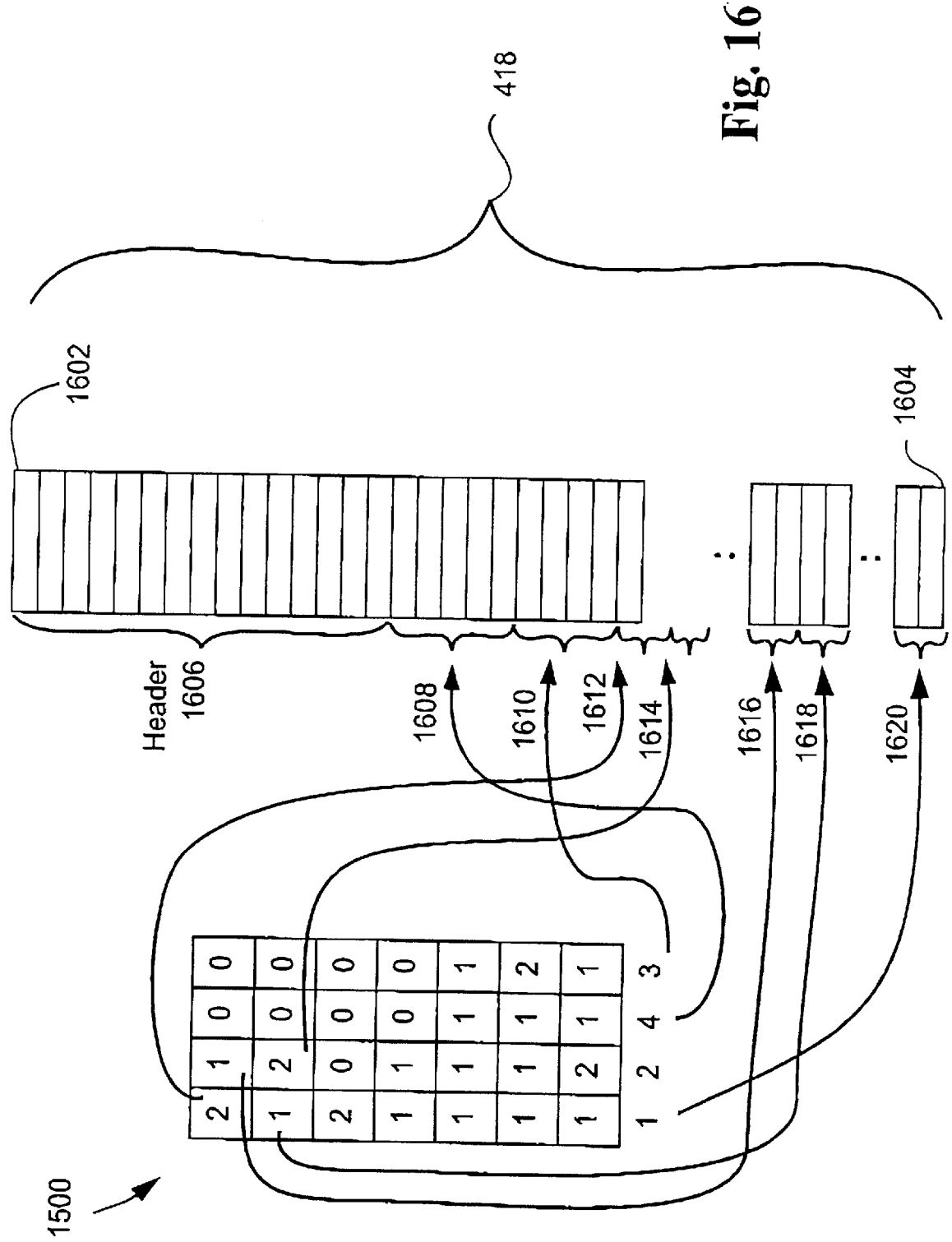

| Word | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| No. of Bit-planes | 2 | 0 | 1 | 0 | 2 | 0 | 1 | 0 | 1 | 1 | 1 | 1 | 1 | 1 | 1 | 4 |
| Offset to header | 25 | X | 45 | X | 31 | X | 47 | X | 51 | 55 | 59 | 63 | 65 | 67 | 71 | 16 |
| No. of Bit-planes | 1 | 0 | 2 | 0 | 0 | 0 | 1 | 0 | 1 | 1 | 1 | 2 | 2 | 1 | 2 | 3 |
| Offset to header | 43 | X | 28 | X | X | X | 49 | X | 53 | 57 | 61 | 34 | 37 | 69 | 40 | 21 |

Fig. 17

DIGITAL IMAGE COMPRESSION AND DECOMPRESSION

TECHNICAL FIELD OF THE INVENTION

The present invention relates generally to digital image compression and decompression.

BACKGROUND

The field of digital data compression and in particular digital image compression has attracted great interest for some time.

In the field of digital image compression, many different techniques have been utilised, such as the popular JPEG standard. The JPEG standard divides the whole digital image into 8×8 blocks of pixels, each of which are then discrete cosine transformed (DCT). The transform coefficients of each block are then quantised and fed in a predetermined scanning order to a run-length coder and entropy coder. Typically, the transform coefficients are buffered between the DCT transformer and entropy coder.

A call for proposals for the new JPEG-2000 standard was recently issued and a draft standard has been published entitled "Information Technology—JPEG 2000 Image coding System—JPEG 2000 Committee Draft version 1.0, Dec. 9, 1999" (herein after referred to as JPEG2000).

JPEG2000 proposes that the whole image be divided into one or more image tile components, each of which are then 2-D discrete wavelet transformed. The transform coefficients of each image tile component are then grouped into sub-bands, which sub-bands are further partitioned into rectangular code blocks before each code block is then entropy encoded.

It has been proposed to use a double buffering arrangement in a hardware implementation of JPEG2000 between the DWT transformer and the entropy coder for each sub-band. However, this proposal suffers from the disadvantage that the amount of memory needed for buffering the transform coefficients is quite large.

SUMMARY OF THE INVENTION

It is an object of the present invention to substantially overcome, or at least ameliorate, one or more disadvantages of existing arrangements.

According to one aspect of the invention, there is provided a method of storing a block of transform coefficients in a buffer between a transformer and at least one coder, the method comprising the steps of: re-arranging said block of transform coefficients into one or more sub-blocks of transform coefficients; generating a lossless compressed representation of the block of transform coefficients for the purposes of reducing storage, wherein the lossless compression technique achieves compression by representing those bit-planes above the most significant bit-planes of the respective sub-blocks in a compact form; and storing said lossless compressed representation in said buffer.

According to another aspect of the invention, there is provided a method of coding a code block of transform coefficients, wherein the code block comprises a predetermined number of bit-planes and the method comprises the steps of: re-arranging the code block of transform coefficients into one or more sub-blocks of transform coefficients; generating groups of bit symbols, wherein the bit symbols of the groups correspond to bit symbols of respective significant bitplanes of the sub-blocks; generating data corresponding to each sub-block indicating the number of significant bit-planes in the corresponding sub-block; storing the groups of bit symbols and the generated data in a buffer; retrieving from the buffer said groups of bit symbols and generated data; reconstituting the bitplanes of the code block from its most significant bitplane to the predetermined minimum bitplane utilising corresponding said groups of bit symbols and said generated data; and bit-plane encoding the reconstituted bitplanes of the code block of transform coefficients.

According to still another aspect of the invention, there is provided a method of decoding a bit-plane encoded code block of transform coefficients, the method comprises the steps of: bit-plane decoding said encoded code block from a most significant bit-plane to a predetermined minimum bit-plane of the code block; re-arranging the decoded code block into one or more sub-blocks of bitplanes; generating groups of bit symbols, wherein the bit symbols of the groups correspond to bit symbols of respective significant bitplanes of the sub-blocks; generating data corresponding to each sub-block indicating the number of significant bit-planes in the corresponding sub-block; storing the groups of bit symbols and the generated data in a buffer; retrieving from the buffer said groups of bit symbols and generated data; sand reconstituting the bitplanes of the code block utilising corresponding said groups of bit symbols and said generated data.

According to still another aspect of the invention, there is provided apparatus for storing a block of transform coefficients in a buffer between a transformer and at least one coder, the apparatus comprising: a controller for re-arranging said block of transform coefficients into one or more sub-blocks of transform coefficients and generating a lossless compressed representation of the block of transform coefficients for the purposes of reducing storage, wherein the lossless compression technique achieves compression by representing those bit-planes above the most significant bit-planes of the respective sub-blocks in a compact form.

According to still another aspect of the invention, there is provided apparatus for coding a code block of transform coefficients, wherein the code block comprises a predetermined number of bit-planes and the apparatus comprises: a module for re-arranging the code block of transform coefficients into one or more sub-blocks of transform coefficients, a controller for generating groups of bit symbols wherein the bit symbols of the groups correspond to bit symbols of respective significant bitplanes of the sub-blocks, and for generating data corresponding to each sub-block indicating the number of significant bit-planes in the corresponding sub-block; a buffer for storing the groups of bit symbols and the generated data; a decoder for retrieving from the buffer said groups of bit symbols and generated data, and reconstituting the bitplanes of the code block from its most significant bitplane to the predetermined minimum bitplane utilising the corresponding said groups of bit symbols and said generated data; and a bit-plane encoder for encoding the reconstituted bitplanes of the code block of transform coefficients.

According to still another aspect of the invention, there is provided apparatus for decoding a bit-plane encoded code block of transform coefficients, the apparatus comprising: a bit-plane decoder for bit-plane decoding said encoded code block from a most significant bit-plane to a predetermined minimum bit-plane of the code block; a module for re-arranging the decoded code block into one or more sub-blocks of bitplanes; a controller for generating groups of bit symbols wherein the bit symbols of the groups correspond to bit symbols of respective significant bitplanes of the sub-blocks, and for generating data corresponding to each sub-block indicating the number of significant bit-planes in the corresponding sub-block; a buffer for storing the groups of bit symbols and the generated data; a decoder for retrieving from the buffer said groups of bit symbols and generated data, and for reconstituting the bitplanes of the code block utilising corresponding said groups of bit symbols and said generated data.

According to still another aspect of the invention, there is provided a computer program for storing a block of transform coefficients in a buffer prior to encoding, the computer program comprising code for re-arranging said block of transform coefficients into one or more sub-blocks of transform coefficients; code for generating a lossless compressed representation of the block of transform coefficients for the purposes of reducing storage, wherein the lossless compression technique achieves compression by representing those bit-planes above the most significant bit-planes of the respective sub-blocks in a compact form; and code for storing said lossless compressed representation in said buffer.

According to still another aspect of the invention, there is provided a computer program for coding a code block of transform coefficients, wherein the code block comprises a predetermined number of bit-planes and the computer program comprises: code for re-arranging the code block of transform coefficients into one or more sub-blocks of transform coefficients; code for generating groups of bit symbols, wherein the bit symbols of the groups correspond to bit symbols of respective significant bitplanes of the sub-blocks; code for generating data corresponding to each sub-block indicating the number of significant bit-planes in the corresponding sub-block; code for storing the groups of bit symbols and the generated data in a buffer; code for retrieving from the buffer said groups of bit symbols and generated data; code for reconstituting the bitplanes of the code block from its most significant bitplane to the predetermined minimum bitplane utilising corresponding said groups of bit symbols and said generated data; and code for bit-plane encoding the reconstituted bitplanes of the code block of transform coefficients.

According to still another aspect of the invention, there is provided a computer program for decoding a bit-plane encoded code block of transform coefficients, the computer program comprising: code for bit-plane decoding said encoded code block from a most significant bit-plane to a predetermined minimum bit-plane of the code block; code for re-arranging the decoded code block into one or more sub-blocks of bitplanes; code for generating groups of bit symbols, wherein the bit symbols of the groups correspond to bit symbols of respective significant bitplanes of the sub-blocks; code for generating data corresponding to each sub-block indicating the number of significant bit-planes in the corresponding sub-block; code for storing the groups of bit symbols and the generated data in a buffer; retrieving from the buffer said groups of bit symbols and generated data; and code for reconstituting the bitplanes of the code block utilising corresponding said groups of bit symbols and said generated data.

BRIEF DESCRIPTION OF THE DRAWINGS

A number of embodiments of the present invention will now be described with reference to the drawings, in which:

FIG. 1 shows the neighbouring significance states of the 8 surrounding coefficients of a coefficient "X[m,n]" utilised in the prior art JPEG2000;

FIG. 2 is a schematic block diagram illustrating an example of the code-block scan pattern for a code block utilised in the prior art JPEG2000;

FIG. 16 shows the memory organisation of the example code block shown in FIG. 15A stored in the code block store 1408;

FIG. 17 shows a table of the header structure of a code block for use in the arrangement 1300 described with reference to an example code block.

DETAILED DESCRIPTION INCLUDING BEST MODE

Figure 3:
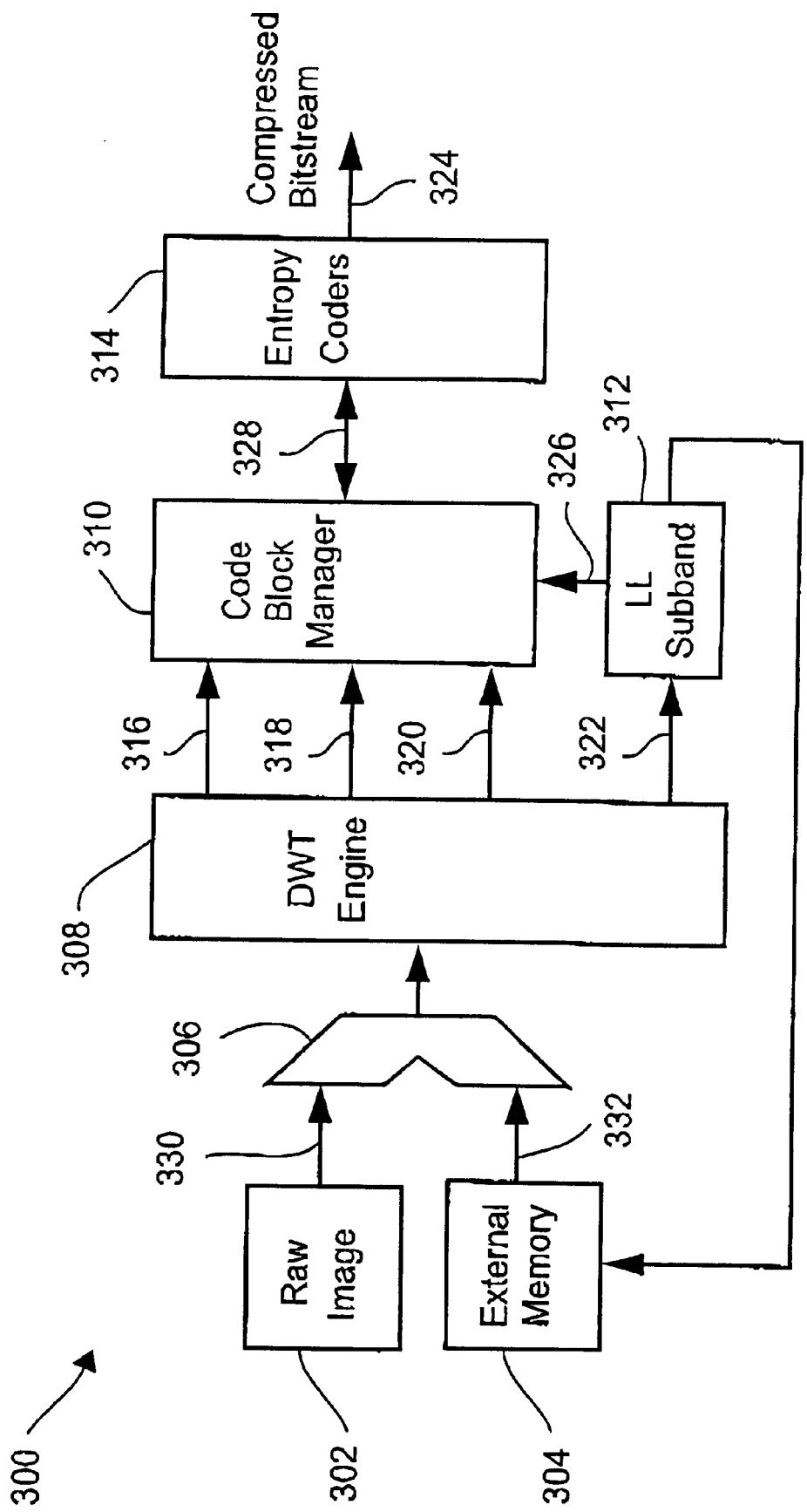
FIG. 3 shows in schematic form an arrangement of an asynchronous discrete wavelet transform (DWT) engine and entropy coders.

Where reference is made in any one or more of the accompanying drawings to steps and/or features, which have the same reference numerals, those steps and/or features have for the purposes of this description the same function(s) or operation(s), unless the contrary intention appears.

The principles of the arrangement described herein have general applicability to coding symbols representative of transform coefficients of one or more blocks of a digital image. For ease of explanation, the preferred arrangement is described with reference to entropy coding binary symbols in accordance with JPEG2000. However, it is not intended that the present invention be limited to the described arrangement. For example, the invention may have application to bit-plane coding techniques in general and other coding techniques.

Before proceeding with a description of the preferred arrangement, a brief review of the JPEG2000 coding method is given. As mentioned previously, JPEG2000 proposes that the whole image be divided into one or more image tile components, each of which are then 2-D discrete wavelet transformed. The transform coefficients of each image tile component are then grouped into sub-bands, which sub-bands are further partitioned into rectangular code blocks before each code block is then entropy encoded.

The transform coefficients of each code block are expressed in a sign-magnitude binary representation prior to entropy coding. The entropy encoding consists of two parts: a context generator and an arithmetic coder. The arithmetic coder takes as input the bit symbol of a coefficient to be encoded and the context of that bit symbol. The context of a bit symbol of a coefficient, which bit symbol is to be coded by the arithmetic coder, is typically based on the 'significance' states of the 8 surrounding coefficients in the same bit-plane of the code block, and in other instances (ie sign coding) is based on other similar information. The 'significance' state of a coefficient is a binary-valued variable $S_i[m,n]$, which is initialised to 0, but transitions to 1 immediately after the coefficient's first non-zero bit value is encoded. FIG. 1 shows the neighbouring significance states $S_i[m-1,n-1]$, $S_i[m-1,n]$ $S_i[m-1,n+1]$, $S_i[m,n-1]$ $S_i[m,n+1]$, $S_i[m+1,n-1]$, $S_i[m+1,n]$ and $S_i[m+1,n+1]$ of the 8 surrounding coefficients of a coefficient "X[m,n]", where m,n are the row and column numbers respectively of the code block and $S_i[]$ is the significance state immediately prior to the encoding of the bit symbol i of the coefficient X[m,n]. These neighbouring significance states are sometimes referred to as the significance states of the 3×3 neighbourhood of the coefficient X[m,n].

The arithmetic coder first codes all the bit symbols of the most significant bit-plane of a code block, then all the bit symbols of the next lower bit-plane of the code block and so on to a least significant bit-plane. Within each bit-plane of a code block, the arithmetic coder codes the bit symbols of the coefficients in three passes in a predetermined order.

The first pass of a bit-plane is called the significance propagation pass (SP pass), the second pass of the bit-plane is called the magnitude refinement pass (MR pass), and the third and last pass of the bit-plane is called the cleanup pass (N pass). During the SP pass, a bit symbol of the bit-plane is encoded if the bit symbol to be encoded has a neighbouring bit symbol, which has a significance state of one(1) but has itself a significance state of zero (0). During the MR pass, a bit symbol of the bit-plane is encoded, if not already encoded, if the coefficient of that bit symbol is already significant in the previous encoded bit-plane. During the N pass, the remaining bit symbols of the bit-plane that have not already been encoded are then encoded.

The context is delivered to the arithmetic coder along with the bit to be encoded and the encoded symbol is output to the bitstream. If the value of this bit symbol to be coded is one (1) and the significance state is zero then the significance state is set to one (1) once the bit symbol is coded and the next immediate bit symbol to be coded is the sign bit for the coefficient. Otherwise, the significance state remains zero (0). When the contexts of successive coefficients and passes are considered, the most current significance state for this coefficient is used.

The arithmetic coder codes the bit symbols of a bit-plane in the three passes (SP, MR, and N) in the same predetermined order. The arithmetic coder first proceeds to the highest bit-plane that has a non-zero bit in it and skips the SP, MR passes and commences with the N pass. The arithmetic coder then proceeds to the next lower bit plane and codes the bit symbols in the three passes (SP, MR, and N) in that order. It then proceeds to the next lower bit plane and codes the bit symbols in the same order of passes (SP, MR, and N) and so on to the least significant bit-plane.

In addition, each bit-plane of a code block is scanned in a particular order. Starting at the top left, the first four bit symbols of the column are scanned. Then the first four bit symbols of the second column, until the width of the code-block has been covered. Then the second four bit symbols of the first column are scanned and so on. A similar scan is continued for any leftover rows on the lowest code blocks in the sub-band. FIG. 2 shows an example of the code-block scan pattern for a code block having 64 transform coefficients arranged in an 8×8 block. As can be seen in this example, the scanning is performed in consecutive strips of four rows. The code block is not limited to an 8×8 block and larger code blocks are envisaged, such as a 32×32 block or a 64×64 code block. In the latter case, there will 16 consecutive strips of four rows.

The entropy decoding described in JPEG2000 is a mirror image of the entropy encoding. For instance, the decoder decodes the symbols in the same order that they were encoded. The entropy decoding also comprises two sections: a context generator and an arithmetic decoder. The arithmetic decoder takes as input the symbol to be decoded and the context of that symbol to be decoded. The context of a symbol to be decoded, which symbol is to be decoded by the arithmetic decoder, is typically based on the 'significance' state of the 8 surrounding coefficients in the same bit-plane of the code block, and in other instances (ie sign coding) based on similar information. The 'significance' state of a coefficient is a binary-valued variable S[m,n], which is initialised to 0, but transitions to 1 when the coefficient's first non-zero bit-plane value is decoded. In this fashion, the significance states of the coefficients during the decoding phase mirrors the significance states of the coefficients during the encoding phase (see FIG. 2).

In JPEG2000 the arithmetic coding and decoding is performed bit-plane by bit-plane, from the most significant bit plane to the least significant bit plane. In the beginning the coding/decoding skips over all the bit planes with only zeroes in them, and begins operation on the first bit plane with non-zero bit symbols in it. Once it reaches this bit-plane, the coder operates on this bit-plane in one pass: the cleanup pass. The coder then operates on each successive bit-plane in three passes: significance propagation pass, magnitude refinement pass and cleanup pass.

Turning now to FIG. 3, there is shown a schematic form of a preferred arrangement of an asynchronous discrete wavelet transform (DWT) engine and entropy coders. The components of this arrangement 300 are preferably implemented as circuitry on an ASIC.

The arrangement 300 comprises a discrete wavelet transform DWT engine 308 and entropy coder 314 suitable for compressing images in accordance with JPEG2000. The original image is first divided into tiles (not shown) in accordance with JPEG2000 and each tile 302 in turn is then input 330 via a multiplexer 306 to the DWT engine 308. The DWT engine 308 performs a multi-level discrete wavelet transform on the tiled image in accordance with JPEG2000. After discrete wavelet transform, a quantisation step is performed by which the transform coefficients are reduced in precision. This quantisation step is lossy unless the quantisation step is one and the coefficients are integer. This quantisation step is performed in accordance with JPEG2000. For the ease of explanation, this quantisation step is incorporated in the DWT engine and is not shown in FIG. 3. The DWT engine 308 outputs in pipeline fashion the quantised transform coefficients of the subbands 316, 318, 320, and 322 of the multi-level discrete wavelet transform.

The DWT engine 308 firstly outputs in pipeline fashion the transform coefficients of the subbands HL 316, LH 318, HH 320, and LL 312 at the first level of the DWT. The transform coefficients of the first level AC subbands 316, 318, and 320 are then fed in pipeline fashion to a code block manager 310. The code block manager 310 divides the transform coefficients of the first level AC subbands 316, 318, and 320 into code blocks and feeds 328 these to the entropy coders 314. The entropy coders 314 encode the bit symbols of the bit-planes of the code block and outputs the coded symbols as a bitstream 324. The code block manager 310 packs the coefficients from each subband in an efficient manner and stores them in an internal memory. The operation of the code block manager 310 and entropy coders 314 will be described in more detail below. The transform coefficients of the first level LL subband 322 output by the DWT engine 308 is stored via a read/write circuit 312 in an external memory 304. The first level LL subband stored in the external memory 304 is then fed 332 via the multiplexer 306 to the DWT engine 308. The DWT engine 308 then performs a discrete wavelet transform on the first level LL subband 322 to produce second level subbands HL 316, LH 318, HH 320, and LL 322. The transform coefficients of the second level subbands HL 316, LH 318, HH 320 are then fed in pipeline fashion to the code block manager 310 and the second level subband LL 322 is fed to the external memory 304 via read/write circuit 312. The code block manager 310 then divides the transform coefficients of the second level AC subbands 316, 318, and 320 into code blocks and feds these to the entropy coders 314. The entropy coders 314 encode the bit symbols of the bit-planes of these code blocks and output the coded symbols in the bitstream 324. The second level LL subband 322 stored in the external memory 304 is then fed 332 via the multiplexer 306 to the DWT engine 308 after the entropy coding of the second level AC subbands 316, 318, and 320 have been completed. The arrangement 300 continues in this fashion until the last DWT level.

After the AC subbands of the last DWT level have been entropy coded by the entropy coders 314, the read/write circuit 312 then retrieves the last level LL subband 322 stored in the external memory 304 and feds it to the code block manager 310. The code block manager 310 divides the last level LL subband into code blocks, which are then fed 328 to the entropy coders 314. Again, the entropy coder 314 encodes the bit symbols of the bit-planes of these code blocks and outputs the code symbols in the bitstream 324.

Preferably, the DWT engine 308 operates in a pipeline fashion. This enables the code block manager 310 to buffer only a portion of the AC subbands at a time, thus minimising the need for a large buffer. Preferably, the DWT engine 308 produces code blocks for each of the LH, HL, and HH subbands in code block raster order.

Preferably, the DWT engine 308 and entropy coders 314 run in an asynchronous mode. The entropy coders 314 will run at a slower speed than the DWT engine 308 when the DWT coefficients have a large magnitude. This is generally true for the coefficients from the subbands after the first level DWT. However, the entropy coders 314 may run faster than the DTW engine 308 when it is processing bit symbols of first level DWT coefficients. Given the non-constant throughput of entropy coders 314, it is more efficient if the DWT engine 308 and entropy coders 314 can run asynchronous. To enable this, the code block manager 310 comprises a buffer for the AC subband coefficients so that the DWT engine 308 can keep on running without being stopped by the entropy coders 314 due to the occurrence of big magnitude coefficients. Since the entropy coders 314 can not start coding before a whole code block is available it is required to buffer a whole code block. As the coefficient magnitude can vary a lot, the buffer depth has to allow room for the maximum magnitude. As a result, even a single buffer for one code block is quite large already. Multiple blocks buffering for AC subbands therefore become very impractical since the amount of memory required is too huge. The preferred arrangement minimises this problem by storing the code blocks in a semi-compressed format as will be explained below in more detail.

It is desirable that the entropy coders 314 comprise three (3) entropy coders for the three (3) AC subbands so that the AC subbands can be entropy coded immediately without having to buffer them to external memory. Preferably, the entropy coders 314 are not dedicated to a specific subband. The reason being that the three (3) AC subbands have very different average magnitudes. In the same level DWT coefficients, the HL subband generally have higher magnitude coefficients than the LH subband, which in turn generally have higher magnitude coefficients than the HH subband. Thus, if each entropy coder is dedicated for a specific subband, it's quite possible that one has finished coding and is idle while the others are still working. Due to the fact that the code block manager 310 has stored the code blocks of each subband in internal memory, a non-dedicated entropy coder can request a new code block when it finishes the current code block. Thus overcoming any idle time and wastage of precious hardware resources. Alternatively, the entropy coders 314 can comprise any number of entropy coders. The number of entropy coders can be decided based on the speed requirement, compression quality and system cost. Each entropy coder can start a new code block without waiting for others. The utilisation of hardware resources and overall speed is greatly improved.

Figure 4:
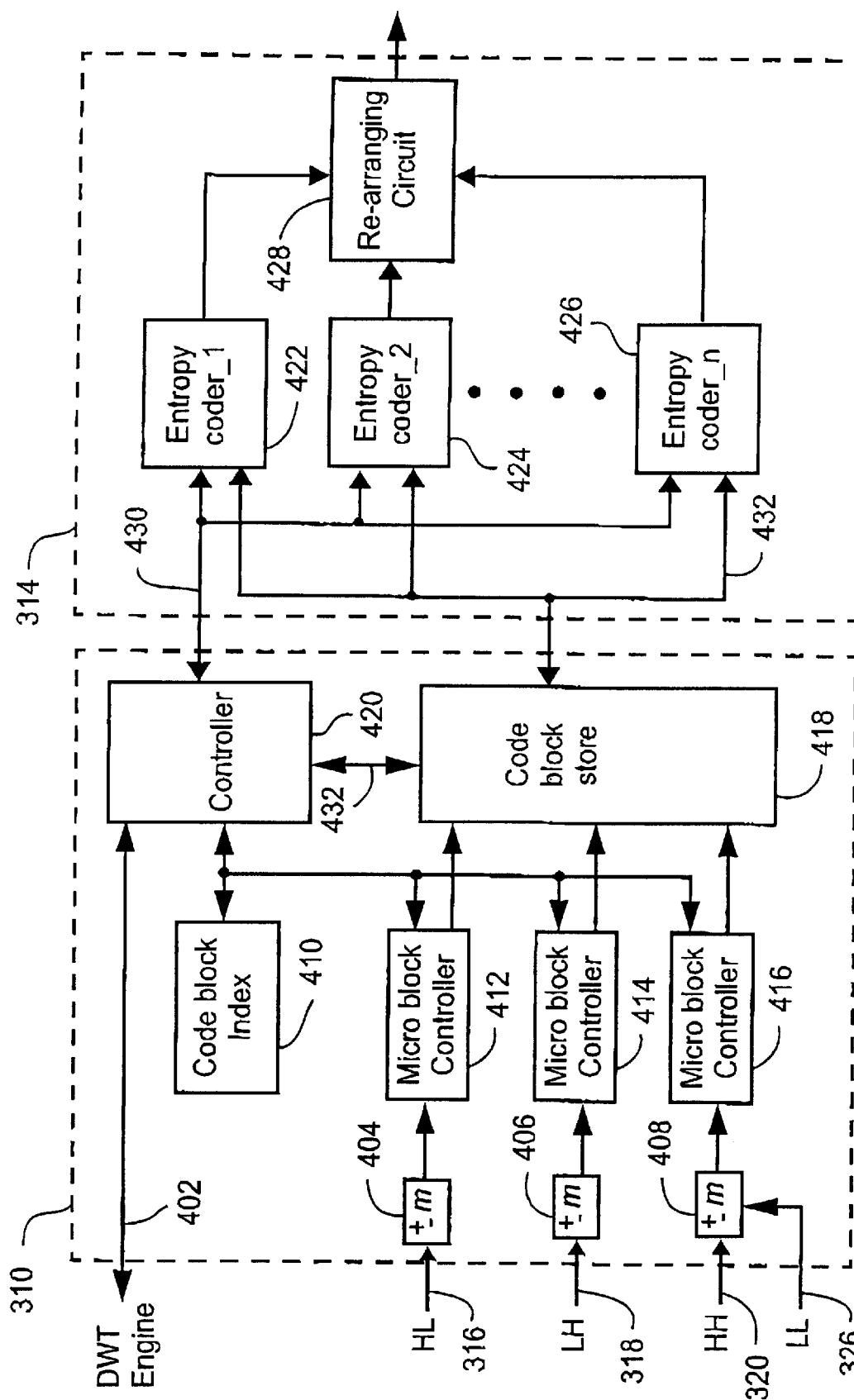
FIG. 4 shows in schematic form the code block manager 310 and entropy coders 314 of FIG. 3.

Turning now to FIG. 4, there is shown in schematic form the code block manager 310 and entropy coders 314 of FIG. 3. The code block manager 310 has four data inputs 316, 318, 320, 326 corresponding to the HL, LH, HH, and LL subbands respectively. Initially, in each clock cycle there will be 3 transform coefficients from respective AC subbands (HL, LH, HH) from the DWT engine 308 fed to the data inputs 316, 318, and 320 respectively.

Each AC subband (HL, LH, HH) channel has a dedicated sign-magnitude format converter 404, 406, 408 and micro-block controller 412, 414, 416 respectively. After the last level DWT AC subband coefficients have been fed to the data inputs 316, 318, and 320, the coefficients of the LL subband of the last DWT level are fed 322 to the sign-magnitude format converter 408 in the HH subband channel. The coefficients of the LL subband are then processed in a similar manner as the coefficients of the HH subband. Preferably, the arrangement 300 comprises three (3) micro block controllers 412, 414, and 416 for three (3) AC subbands, thus the LL subband can make use one of the 3 AC micro-block controllers 412, 414, and 416 for entropy coding by repeating the DWT engine 308 for the last level. This approach can save the extra hardware cost for the LL subband entropy coding, as it only takes a very small portion of the compression time for the whole image.

As mentioned previously, JPEG2000 requires that the transform coefficients of each image tile component are grouped into sub-bands, which sub-bands are further partitioned into rectangular code blocks before each code block is then entropy coded. In the present arrangement 300, these code blocks are further partitioned into one or more micro blocks for the purposes of reducing storage before the code blocks are entropy coded.

Figure 5:
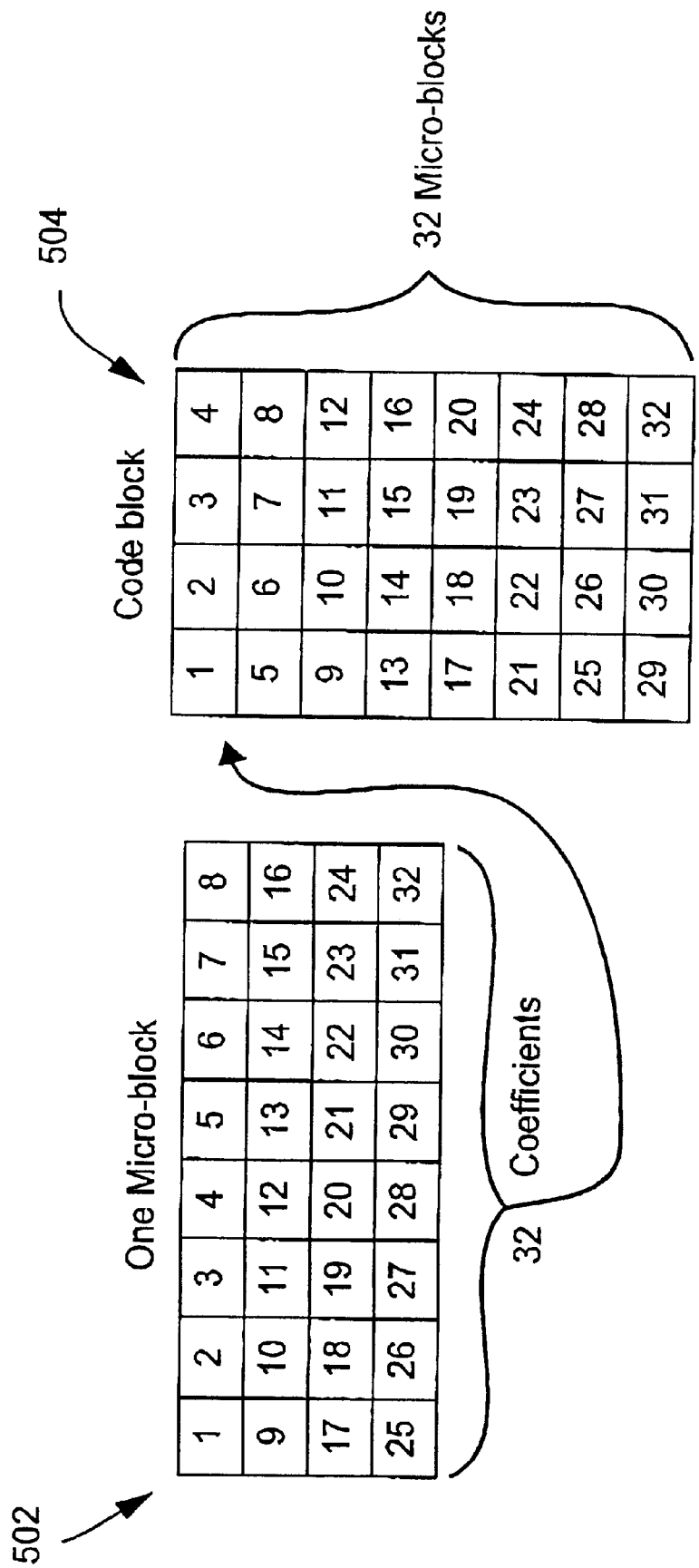
FIG. 5 shows the partitioning of a code block into micro blocks and the corresponding coefficient output order from the DWT engine 308.

Turning now to FIG. 5, there is shown the partitioning of a code block into micro blocks and the corresponding coefficient output order from the DWT engine 308. Preferably, each micro block comprises an 8×4 array of transform coefficients within a code block, where the code block comprises one or more of such micro blocks. In the example shown, the code block 504 comprises a 32×32 array of transform coefficients arranged as eight rows of four micro-blocks, a total of 32 micro-blocks. Also, each micro-block 502 comprises a 4×8 array of coefficients. The DWT engine 308 is designed to output in micro blocks the coefficients of a code block of a subband. The DWT engine 308 outputs the micro blocks 1, 2, 3, 4, . . . , 32 of the code block 504 in raster scan order as shown. Within a micro block 502, the DWT engine 308 outputs the reprective coefficients 1, 2, 3, . . . , 32 in raster scan order as shown. Alternatively, the output can be in column raster scan order as opposed to a row raster scan order, for a micro-block.

Returning now to FIG. 4, the operation of the micro block controllers 412, 414, and 416 will now be described. Each micro block controller 412, 414, 416 operates in an identical manner and for ease of explanation only one (412) will be described. The micro-block controller 412 accepts coefficients of a micro block in raster scan order from the converter 404 in the manner described with reference to FIG. 5. The micro block controller 412 rearranges these coefficients of a micro block in bit-plane order and stores the bit-plane data of the micro block in the code block store 418. That is, the micro block controller 412 writes to the code block store 418 the bit symbols of the coefficients of each bit-plane of the micro block starting from the sign bit followed by the first significant bit-plane of the micro block to a predetermined minimum bit plane. Preferably, the predetermined minimum bit-plane is the bit-plane zero. The micro block controller 412 does not store in the code block store 418 the bit symbols of those bit-planes higher than the first significant bit-plane of the micro block. The number of significant bit planes in a micro-block is also determined by the micro block controller 412 and is stored in the code block store 418 in a header after predetermined number (eg. 8) of micro-blocks have been input. The micro block controller 412 will continue in this fashion processing each micro block until a whole code block has been stored in the code block store 418. The micro block controller 412 then determines the maximum number of significant bit planes of the whole code block and stores this in a first word of the header. In this manner, the coefficients of a code block are stored in a semi-compressed format for latter entropy coding when required. The manner in which the code blocks and their micro blocks are stored in the code block store 418 will be described in more detail below.

The entropy coder 314 comprises multiple entropy coders 422, 424, 426, which can independently request a code block from the code block store 418 to code. Whenever a entropy coder 422, 424, 426 finishes a code block, it can immediately request another code block without waiting for the other subband code blocks provided there are code blocks available in the code block store 418. The entropy coded code blocks are then fed by the entropy coders 422, 424, and 426 as a bitstream to an re-arranging circuit 428 which orders and outputs them along with header information as a single bitstream in accordance with JPEG2000. A controller 420 is coupled to the micro block controllers 412, 414, and 416, the code block store 418, the entropy coders 422, 424, and 426, a code block index table 410 the DWT engine 308 and the combining circuit 428 for controlling the timing and operations of these devices. In particular, when a whole code block of coefficients are all present in the code block store 418, the controller 420 writes the entry of this code block in the code block store 418 to a code block index table 410. In this manner, a code block index table 410 is built of the stored code blocks, which are ready to be entropy coded.

The code block store 418 stores coefficients in code blocks, which are to be entropy coded. The coefficients are stored in a format that only stores bit-planes from the first significant bit plane to a predetermined minimum bit-plane. Preferably, the predetermined minimum bit-plane is the bit-plane zero. The bit-planes that have leading zero bits only, that is those above the first significant bit plane, are not stored and thus do not take space in the memory in the code block store 418. The coefficients within a code block are packed in memory in micro block scan order. Within a micro block, the sign bit-plane of the micro block comes first and is followed by the first significant bit-plane of the micro block and then the rest of the bit-planes of the micro block. The stored code block also comprises a header containing information on the number of significant bit-planes in each micro block and the maximum significant bit-plane of the code block overall. The header is stored in front of the actual bit-plane data. In this fashion, the coefficients of a code block are stored in a semi-compressed lossless manner.

Figure 6:
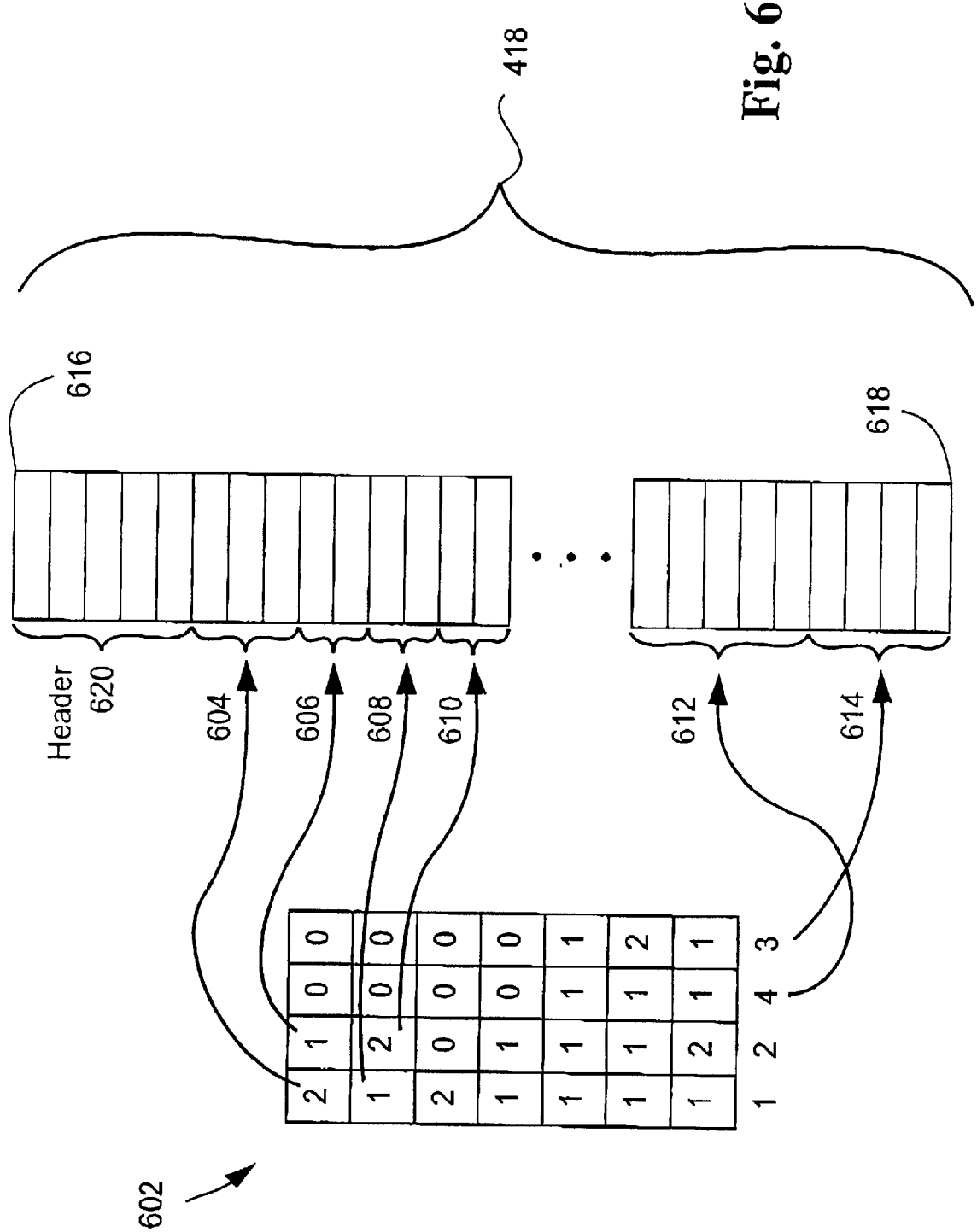
FIG. 6 shows the memory organisation of an example 32×32 code block stored in the code block store 418.

Turning now to FIG. 6, there is shown the memory organisation of an exemplary 32×32 code block 602 stored in the code block store 418. The code block 602 is stored in the memory of the code block store 418 in the following manner. For sake of clarity, only one code block 602 is shown stored in the code block store 418. It is intended that the code block store 418 is of such a size that it can buffer numerous code blocks while these code blocks are waiting to be entropy coded by the entropy coders 422, 424, and 426. The code block 602 is stored as 32 bit words in the code block store 418 commencing with a first word 616 and terminating with a last word 618. The example code block 602 stored in the code block store 418 has a header 620 comprising five words followed by the micro blocks of the code block 602.

The example code block 602 comprises a 32×32 array of coefficients arranged as 8×4 micro blocks each comprising 4×8 coefficients, where each bit-plane of a micro block comprises 32 bits. The number of significant bit-planes within each micro block is shown inside each micro block of the example code block 602. These significant bit-planes comprising 32 bits are stored as respective 32 bit words in the code block store 418. Similarly, the sign bit-planes of the micro blocks are stored as respective 32 bit words in the code block store 418.

The first micro block, on the top left corner of code block 602, has 2 significant bit-planes. The bit-plane comprising the sign bits of this micro block is stored in the code block store 418 as one word and followed by the 2 significant bit-planes of this micro block which are stored as two respective words. These three words are stored at location 604 in the code block store 418, with the sign bit word being stored first. The second micro block in raster scan order has one significant bit-plane only. In this case, the bit-plane comprising the sign bits of this micro block is stored first as one word followed by the significant bit-plane of this micro block as the next word. The latter two words are stored at location 606 in the code block store 418. The third and fourth micro blocks in raster scan order do not have any significant bit-planes, so they are not stored in memory of the code block store 418. The next non-zero micro block is then stored. Namely, the fifth micro block in raster scan order stores its sign bits as one word followed by the one significant bit-plane stored as one word. The latter two words are stored at location 608 in memory of the code block store 418. The sixth micro block in raster scan order stores in sign bits as one word followed by the two significant bit-planes stored as two words. The latter three words are stored at location 610 in memory of the code block store 418. The same mechanism applies on the rest of the micro blocks through to the last micro block. For instance, the second last micro block in raster scan order stores its sign bits as one word followed by the four significant bit-planes stored as four words. The latter five words are stored at location 612 in memory of the code block store 418. The last micro block in raster scan order stores its sign bits as one word followed by the three significant bit-planes stored as three words. The later four words are stored at location 614 in memory of the code block store 418.

Preferably, a transform coefficient comprises up to 16 bits inclusive of a sign bit. Thus the amount of memory required for the stored example code block 602 in this lossless semi-compressed format is $(3+2+2+3+3+2+2+2+2+2+2+2+2+2+3+2+3+2+2+2+3+5+4) \times 4 + 5 \times 4$ bytes $= 54 \times 4 + 5 \times 4 = 232$ bytes. On the other hand, if the example code block 602 was stored in a non-compressed format, the amount of memory required would be $32 \times 32 \times 2 = 2048$ bytes. In this way, the semi-compressed lossless format greatly reduces the amount of memory required for AC buffering. Moreover, the transform coefficients are stored in such a way suitable for bit plane encoding.

Figures 7, 8:
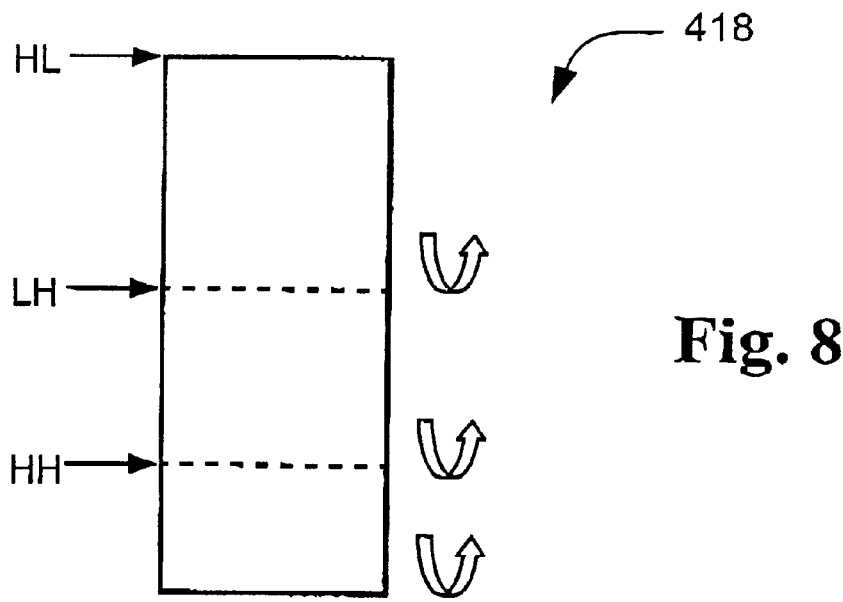
FIG. 7 shows a Table of the header structure of an example code block stored in the code block store 418.
FIG. 8 shows an example partition of the code block store 418.

Turning now to FIG. 7, there is shown a Table of the header structure described with reference to the example code block 602. The first word (Word0) of header stores information indicating the maximum significant bit-plane of the whole code block overall. The next words Word 1, Word2, Word3, and Word4 store information indicating the number of significant bit-planes in each micro block. As the transform coefficients in this example are 16 bits inclusive of the sign bit, 4 bits are needed to store the information of the number of significant bit-planes for each micro block. Also, since the memory of the code block store 418 is 32-bits wide, information indicating the number of significant bit planes for eight micro blocks can be packed into word. In this particular example, Word0 indicates that the maximum significant bit plane of the whole code block is four (see second last micro block in raster scan order in FIG. 6). Furthermore, Word1 indicates that the number of significant bit planes in the first through to the eighth micro blocks in raster scan order is 2, 1, 0, 0, 1, 2, 0, 0 bit-planes respectively (see FIG. 6). Word2, Word3, Word4 indicate the number of significant bit planes in the remaining micro blocks. The same mechanism can apply to any code block size and transform coefficient size with appropriate changes to the size of header.

Turning now to FIG. 8, there is shown an example partition of the code block store 418. Preferably, the memory in code block store 418 is partitioned into three fixed parts corresponding to the three AC subbands HL, LH, and HH. The three AC subbands HL, LH, and HH have its own area in memory in the code block store 418. Thus 3 micro blocks from 3 micro block controllers 412, 414, 416 can be written to the respective areas HL, LH, and HH of the code block store 418 at any one time. As the required space for each code block is variable, the arrangement 300 manages the memory allocation for each code block by recording the location of each code block in the code block index table 410. The partitioning of the code block store 418 is predetermined and can be done in a way that the average size of each AC subband is considered. The HL subband has the highest average size and so it should be given the biggest partition. The LH subband is close in size to the HL subband so it can be allocated substantially the same size partition. The HH subband has the smallest average size, so the partition for this subband can be smaller. The code blocks within a particular subband can then be packed one after the other. Preferably, each partition can work as a circular buffer. Once data being written by a micro-controller reaches the lower boundary of the partition, it then returns to the top boundary for writing.

The entry for each code block is recorded in the code block index table 410. The partitioning of and the read/write operations of the code block store 418 is controlled by the controller 420 in co-operation with the code block index table 410, which will be described in more detail below. The allocation for each partition, viz subband, can be made on per image basis depending on the desired compression ratio. For example, heavy quantisation will reduce the memory requirements needed for the HH subband and thus its partition. Alternatively, the code block store 418 may not be partitioned. In this case, the header of the micro-block can be adapted to indicate which one of the subbands HL, LH, and HH the micro-block belongs to.

Figure 9:
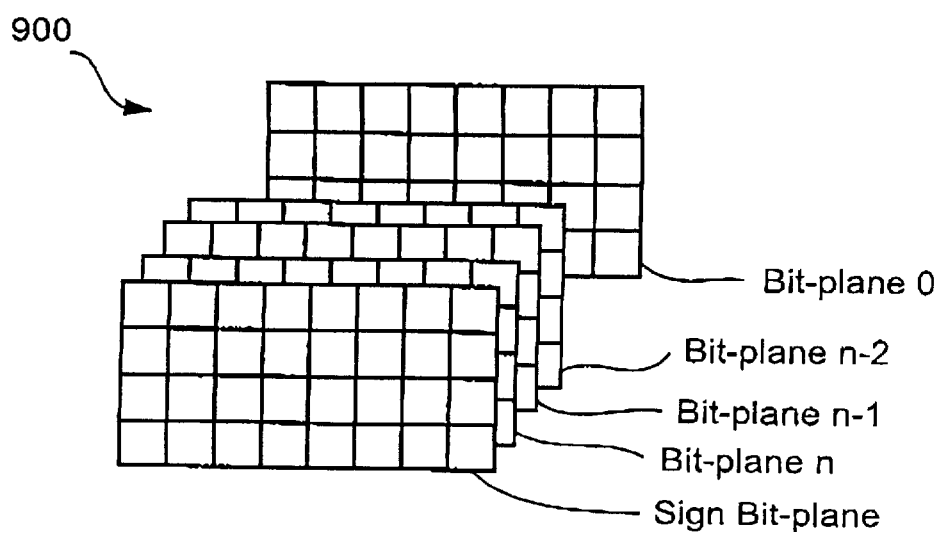
FIG. 9 shows the memory organisation of a buffer 900 of a micro-controller 412, 414, or 416.

Turning now to FIG. 9, there is shown the memory organisation of a buffer 900 of a micro-controller 412, 414, or 416. Each micro block controller 412, 414, 416 have the same functional features and operate in an identical manner and for ease of explanation only one (412) will now be described. The micro block controller 412 has a buffer 900 as shown in FIG. 9, which enables coefficients input in raster order as shown in FIG. 5 and output in bit-plane order starting from the sign bit followed by the first significant bit plane to the predetermined minimum bit plane sequentially. Preferably, the predetermined minimum bit plane is zero. As a coefficient is input to the micro-controller 412, the binary symbols of the coefficient are stored at a location in the buffer 900 corresponding to its raster order and bit plane number. Once all 32 coefficients of the micro-block have been input and stored in the buffer 900, the micro-controller 412 tests the maximum magnitude of the coefficients in the micro-block. The maximum magnitude determines the highest significant bit-plane of the micro-block (excluding the sign bit-plane). Namely, the maximum magnitude determines the most significant bit-plane of the micro-block (excluding the sign bit-plane). If the maximum magnitude is zero, no bit-plane will be written out by the micro-controller 412 for storing in the code block store 418. If the maximum magnitude's first significant bit-plane is m-1, the sign bit-plane will be written out first followed by bit-plane m-1 until the zero bit-plane. The micro-controller 412 also stores the number m in the corresponding header location representing the number of bit-planes in this micro block. In the case where maximum magnitude is zero for the micro-block, the micro-controller 412 stores the number zero (0) in the header for this micro block. It is preferable to have double buffers for each channel so that the DWT engine 308 can keep on running while the micro block controllers (412, 414, 416) write the bit-plane data into the code block store 418. Once the whole code block's coefficients have been input to the micro-controller 412, the maximum magnitude of the code block is determined by the micro-controller 412 and its number of bit-planes will be written to the first word of the corresponding header stored in the code block store 418.

Figure 10:
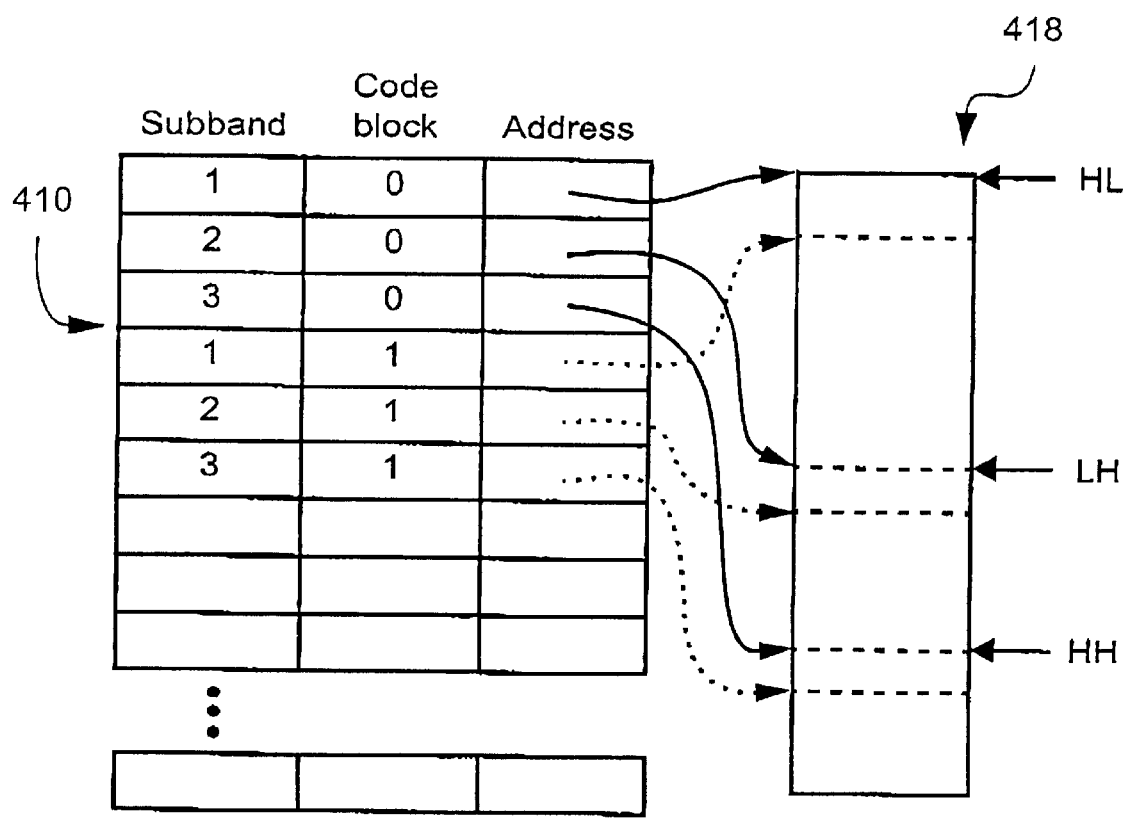
FIG. 10 shows a code block index table 410 and memory organisation of the code block store 418.

Turning now to FIG. 10, there is shown a code block index table 410 and memory organisation of the code block store 418. The code block index table 410 maintains the state of the code block store 418. When a whole code block of coefficients are all present in the code block store 418, the controller 420 writes the entry of this code block in the code block store 418 to the code block index table 410. A FIFO preferably implements the code block index table 410. Each entry in the code block index table 410 comprises a field indicating the subband, a field indicating the code block, and an address indicating the address in memory of the code block store 418 where the corresponding code block is stored. In the example shown, an entry of '1' in the subband field indicates that the code block is from the HL subband. Similarly, an entry of '2' or '3' in the subband field indicates that the code block is from the LH or HH subband respectively. An entry of "0" in the code block field indicates that the code block is the first code block stored in the code block store 418 and so on. An entropy coder 422, 424, or 426 is assigned with the first code block present in the FIFO 410 whenever it makes a request to the controller 420 and the FIFO 410 is not empty. Once the code block is assigned to an entropy coder 422, 424, or 426 the corresponding entry is removed from the FIFO 410. The next entropy coder request will again be assigned with the first code block in the FIFO 410. When the FIFO 410 is full, the DTW engine 308 should stop and wait until there is space in the FIFO 410 since the entropy coders 422, 424, or 426 can not keep up.

Figure 11:
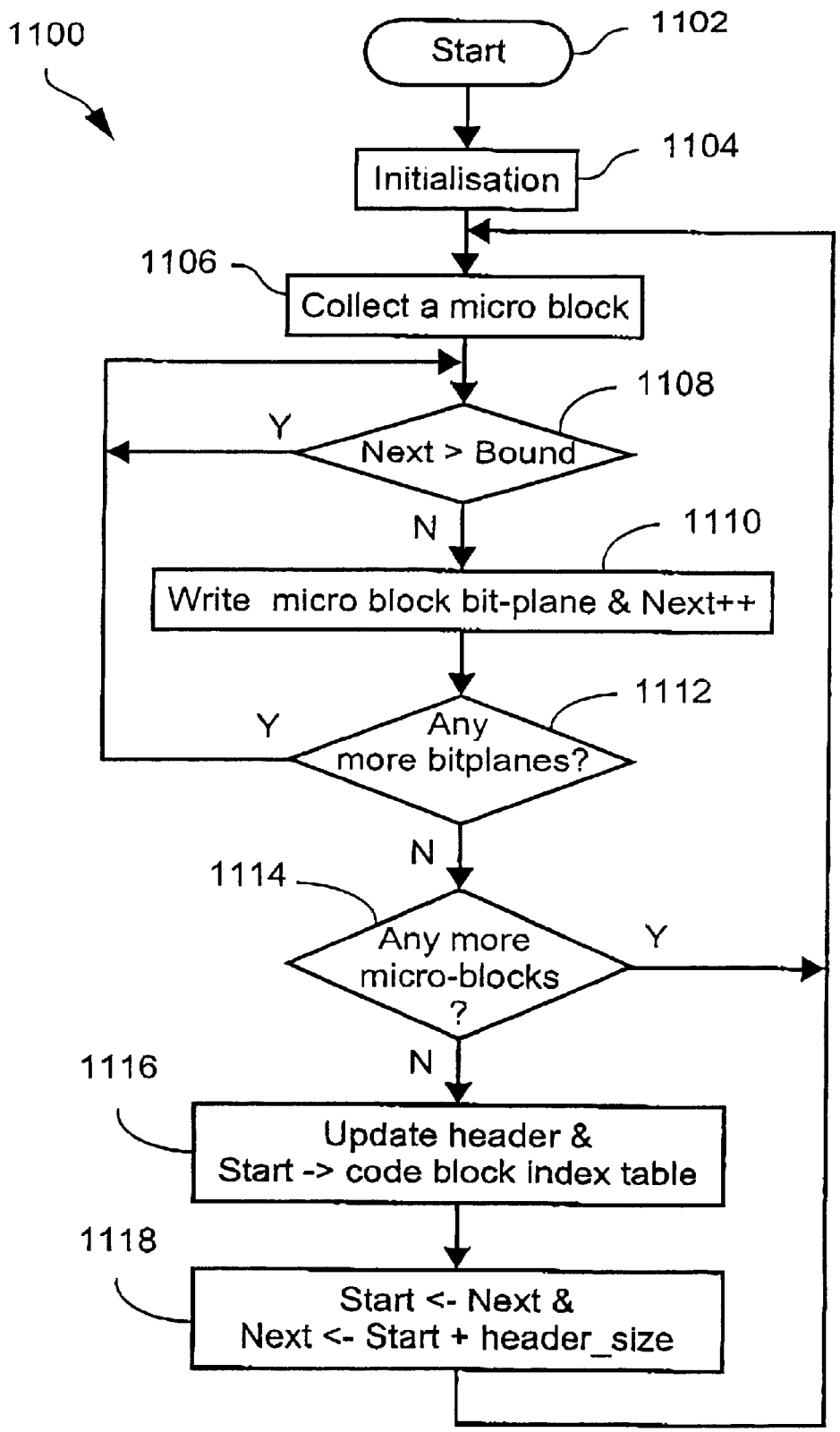
FIG. 11 shows a flow chart of a method for maintaining the coherence between the micro-controllers 412, 414, and 416 and the entropy coders 422, 424, and 426.

Turning now to FIG. 11, there is shown a flow chart of a method 1100 for maintaining the coherence between the micro-controllers 412, 414, and 416 and the entropy coders 422, 424, and 426. As the code block store 418 works as 3 circular buffers for 3 subbands, the coherence between the micro block controllers (412, 414, 416) and the entropy coders (422, 424, and 426) has to be maintained. This method makes sure that code blocks stored in the code block store 418 and yet to be coded will not be overwritten by the micro block controllers (412, 414, 416). Furthermore, it makes sure that the entropy coders do not read data that is not yet ready for processing. Each micro block controller (412, 414, 416) preferably performs this method 1100.

Each micro block controller (412, 414, 416) comprises 3 registers named Next, Start and Bound. The Next register stores the bit-plane address of the next bit-plane of the micro-block in the code block store 418. The Start register stores the starting address of a code block in the code block store 418. The Bound register stores the limit of the free space in the code block store 418.

Each micro block controller 412, 414, 416 has the same functional features and operates in an identical manner, and for ease of explanation the method will be described with reference to the micro-block controller (412) and the HL subband partition of the code block store 418 only.

The method 1100 commences at step 1102 in response to a control signal from the controller 420. The method 1100 then proceeds to step 1104 where any necessary initialisation is performed. In particular, the Start register is first initialised with the start address of the HL subband allocation and the Next register is initialised with the Start register value plus the offset of the header. The Bound register is initialised with the last address of the HL subband allocation. The method then proceeds to step 1106, where the micro-controller 412 collects a micro-block from the DTW engine 308.

The method then proceeds to decision block 1108, where a comparison is made whether the address stored in the register Next is greater than the address stored in the register Bound. If the decision block 1108 returns yes (TRUE), the micro-block controller 412 will stall until memory in the HL subband partition of the code block store 418 is freed by an entropy coder (422, 424, and 426). Once freed, the Bound register will be updated with the last address of a code block when an entropy coder acknowledges the completion of entropy coding of that code block. The method then recommences at decision block 1108. The comparison of the Next and the Bound register should take into account the fact that the buffer is a circular buffer.

On the other hand, if the decision block 1108 returns false (NO), the method continues to step 1110. During step 1110, the method writes a bit-plane of the micro-block to the HL partition of the code block store 418 and increments the Next register to the address of the next bit-plane in the micro-block. After step 1110, the method 1100 continues to decision block 1112, where a check is made whether there are any more bit-planes of the current micro-block to be written to the code block store 418. If the decision block 1112 returns yes (TRUE), the method 1100 returns to decision block 1108, where the method 1100 continues the processing for the next bit-plane in the micro-block. On the other hand, if the decision block 1112 returns no (FALSE), the method 1100 continues to decision block 1114, where a check is made whether there are any more micro-blocks in the current code block to be written to the code block store 418. If the decision block 1114 returns yes (TRUE), the method 1100 returns to step 1106, where the micro-controller 412 retrieves the next micro-block from the DTW engine 308. On the other hand, if the decision block returns no (FALSE), the method continues to step 1116, where the header of the code block previously stored in the code block store 418 is updated. During step 1116, the method also sets the code block address field in the code block index table 410 to the current address in the Start register. The method then proceeds to step 1118, where the Start register is set to the address of the current address in the Next register and the Next register is set to the address in the Start register plus the offset of the header. The method 1100 then returns to step 1106 for processing of the first micro-block of the next code block. The method 1100 terminates once all the code blocks have been processed.

Figure 12:
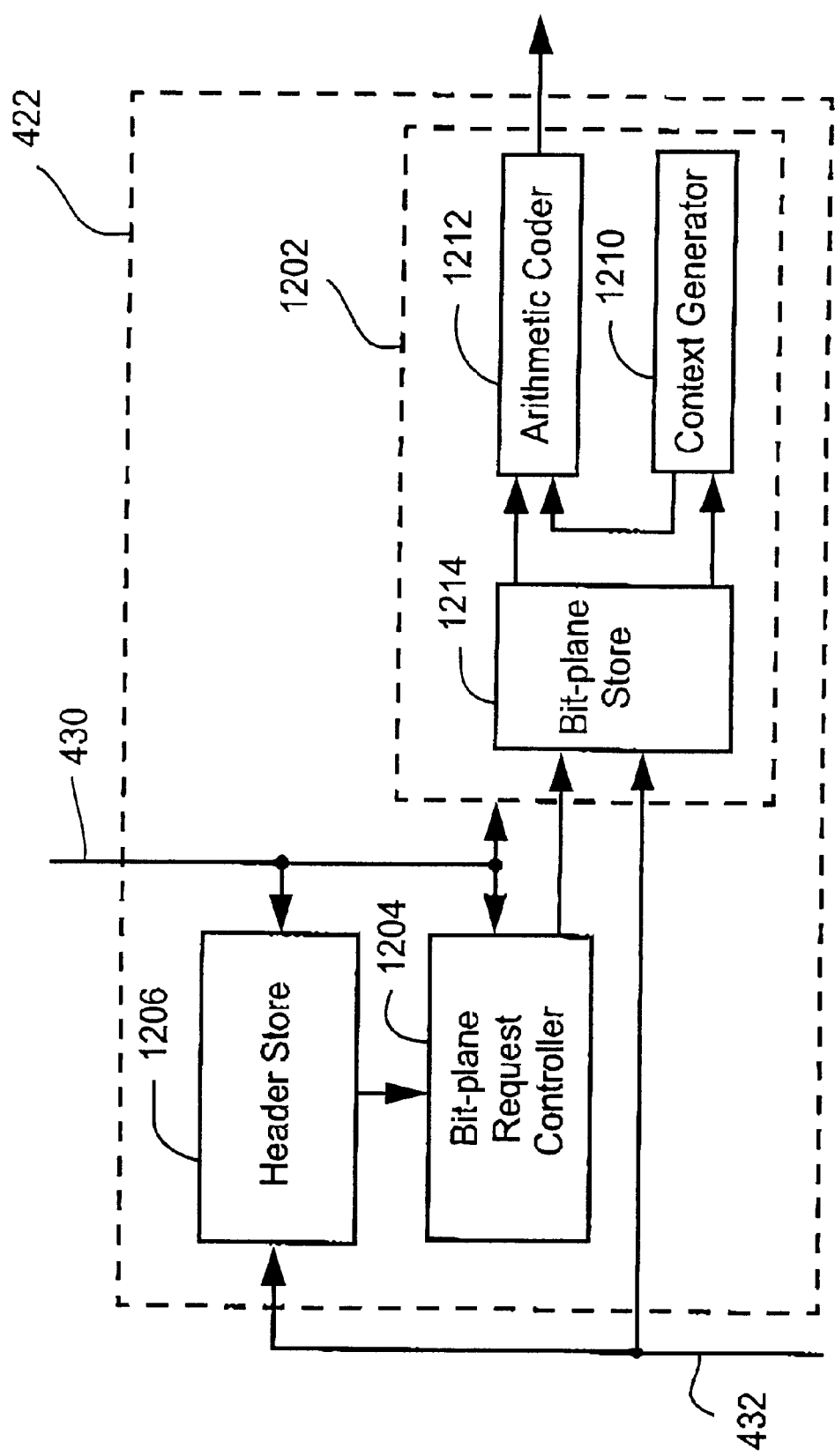
FIG. 12 shows an entropy encoder 422 for use in the arrangement 300.

Turning now to FIG. 12, there is shown an entropy encoder 422 for use in the arrangement 300. Each entropy encoder 422, 424, 426 has the same functional features and operates in an identical manner and for ease of explanation only one (422) will now be described. The entropy encoder 422 comprises an entropy coder 1202, a bit-plane request controller 1204 and a header store 1206 for storing the header of a current code block. The entropy coder 1202 comprises a bit-plane store 1214 for storing a current bit-plane of a current code block, an arithmetic coder 1212 and context generator 1210. The arithmetic coder encodes the bit symbols of the stored current bit-plane in accordance with the JPEG2000. Similarly, the context generator 1210 generates a context for the arithmetic coder 1212 in accordance with JPEG2000.

The entropy coder 422 is assigned with the first code block present in the FIFO 410 whenever it makes a request 430 to the controller 420 and the FIFO 410 is not empty. The entropy coder 422 makes such a request 430 when it is ready to commence coding. The controller 420 then makes a read request 432 of the code block store 418, which supplies 326 the header of the corresponding code block to the store 1206.

As mentioned previously, the arithmetic coder according to JPEG2000 first codes all the bit symbols of the most significant bit-plane of a code block, then all the bit symbols of the next lower bit-plane of the code block and so on to a least significant bit-plane. The arithmetic coder according to JPEG2000 does not code those bit planes above the most significant bit-plane. Rather, the number of bit-planes above the most significant bit plane that have zero bits is included in the header of the coded symbols. The bit-plane request controller 1204 determines this number from the first word in the code block header stored in store 1206 and passes this information on to the combining circuit for forming a packet header of the subsequent coded code block (not shown).

The bit-plane request controller 1204 then re-constitutes the most significant bit plane from the bit-plane information stored in the code block store 418 and the header information stored in store 1206 and stores this re-constituted bit-plane in the bit-plane store 1214 for subsequent arithmetic coding according to JPEG2000. After the coding of this re-constituted bit plane, the bit-plane request controller 1204 re-constitutes the next lower bit-plane of the code block and so on to a least significant bit-plane in a similar fashion. During this process, the bit-plane request controller 1204 keeps track of the bit-plane number of the bit-plane presently being re-constituted.

The bit-plane request controller 1204 first accesses the header information stored in the header store 1206 during the re-constitution of a current bit-plane. The bit-plane request controller 1204 processes this header information in micro-block raster scan order (see FIG. 5). The bit-plane request controller 1204 first determines the number of significant bit-planes of the current micro-block from the header information. The bit-plane request controller 1204 then determines if the number n+1, where n is the bit-plane number of the bit-plane presently being re-constituted, is greater than the number of significant bit-planes of the current micro-block. In the event that it is, the bit-plane request controller 1204 then fills 1208 the bit-plane store 1214 with zeros at those locations corresponding to the current micro-block. Otherwise, the bit-plane request controller 1204 requests via the controller 420 the corresponding bit-plane of the current micro-block stored in the code block store 418 and writes 432 this to the bit-plane store 1214 at those locations corresponding to the current micro-block. Once a bit-plane has been re-constituted and stored in the bit-plane store 1214, the arithmetic coder 1212 and context generator 1210 processes this re-constituted bit-plane in accordance with JPEG2000.

In a variation of the entropy encoder 422, the bit plane store 1214 comprises a store for storing a whole bit plane of a code block, which is initialised to zero prior to reading a bit plane of a code block from the code block store 418. The entropy encoder 422 then processes each micro block bit plane in turn of a current bit plane. During this processing, the entropy encoder 422 first determines whether the current micro block bit plane is insignificant from the header stored in the code block store 418. Or in other words, the entropy encoder 422 determines whether the current micro block bit plane is above the bit plane of the micro block containing the most significant bit of the micro block. If the micro block bit plane is not insignificant, then the entropy encoder 422 will read the micro block bit plane from the code block store 418 and store it in the bit plane store 1214 at the relevant location. Otherwise, the entropy encoder 422 will proceed directly to processing the next micro block bit plane in the current bit plane.

It thus will be apparent that the decoding of the above-mentioned lossless compressed format by the entropy encoder 422 is a nominal decoding. This nominal decoding extracts the relevant micro block bit planes from the code block store 418 as is and either pads with zeroes or pre-initialises with zeros the bit-plane store 1214 to take into account the insignificant micro block bit planes. Many other ways are possible for decoding this lossless compressed format.

In a still further variation of the arrangement 300, the bit-plane store 1214 of entropy encoder 1202 is adapted to store only two or three strips of the current bit-plane thus saving memory space. In this variation, the arithmetic coder 1212 processes the bit symbols of strips of the current bit-plane.

Figure 13:
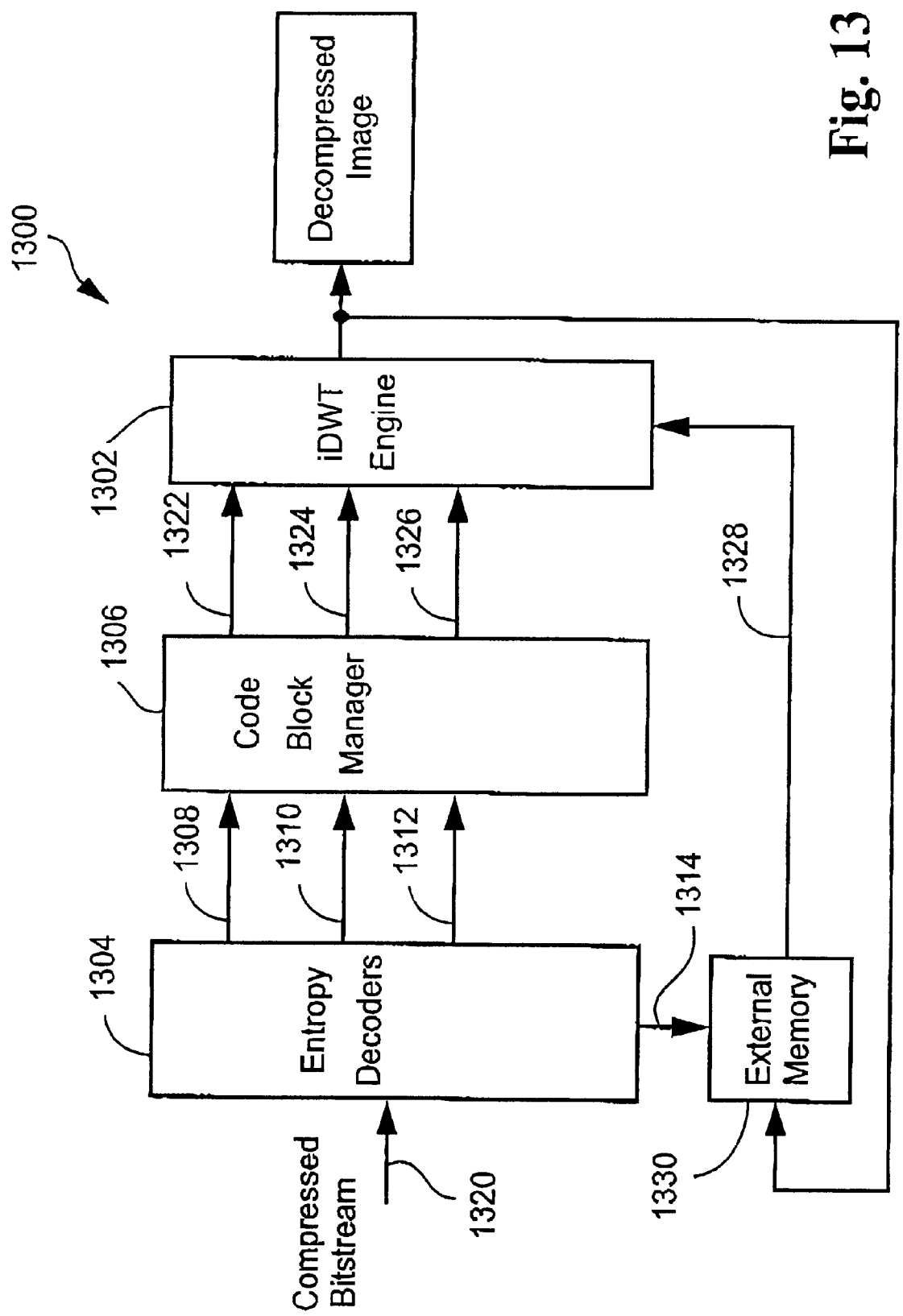
FIG. 13 shows in schematic form an arrangement of an asynchronous inverse discrete wavelet transform (DWT) engine and entropy decoders.

Turning now to FIG. 13, there is shown in schematic form an arrangement of an asynchronous inverse discrete wavelet transform (DWT) engine 1302 and entropy decoders 1304. The components of this arrangement 1300 are preferably implemented as circuitry on an ASIC.

The arrangement 1300 is suitable for decoding images compressed in accordance with JPEG2000. A similar approach is used in this arrangement 1300 as is described previously in the arrangement 300. For example, both minimise the storage requirements between the entropy coders and the discrete wavelet transforms by utilising the same lossless semi-compression method. In the previously described arrangement 300, the code block manager 310 semi-compresses the transformed coefficients and stores them in a code block store 418. The entropy encoders 314 read these semi-compressed coefficients and decompress them for subsequent entropy encoding. In the present arrangement 1300, the code block manager 1306 semi-compresses the entropy decoded transform coefficients and stores them in a code block store. The inverse discrete wavelet engine (DWT) 1302 reads these semi-compressed coefficients and decompresses them before subsequently performing the inverse wavelet discrete wavelet transform.

The entropy decoders 1304 preferably comprise three entropy decoders for decoding and outputting the encoded code blocks of subbands HL, LH, and HH asynchronously to the inverse DWT engine 1302 via the code block manager 1306. Preferably, one of the entropy decoders 1304 decodes the code blocks of both one of the AC subbands and the LL subband. The latter entropy decoder 1304 decodes the code blocks of the LL subband and feds 1314, 1328 these asynchronously to the inverse DWT engine 1302 via external memory 1330. Initially, viz at the "last" level of the DWT, the three entropy decoders 1304 accepts as input in pipeline fashion the encoded code blocks 1320 of the subbands HL, LH, and HH. The three entropy decoders 1304 fed in pipeline fashion the decoded code blocks of the subbands HL 1308, LH 1310, and HH 1312 to a code block manager 1306. The decoded code blocks of subband LL are fed 1314 to an external memory 1330.

According to JPEG2000, the encoded subbands are divided into code blocks in the compressed bitstream 1320. The code block manager 1306 accepts as input these decoded code blocks of each subband in pipeline fashion and semi-compresses and stores these semi-compressed code blocks internally in a code block store. The code block manager 1306 feeds in pipeline fashion the semi-compressed code blocks of the subbands HL 1322, LH 1324, and HH 1326 to the inverse discrete wavelet engine 1302. At the same time, the code blocks of the corresponding level LL subband are fed from external memory to the inverse DWT engine 1302. The inverse discrete wavelet engine 1302 decompresses these semi-compressed code blocks and performs an inverse discrete wavelet transform on the subbands HL 1322, LH 1324, HH 1326 and LL 1328 to produce either the decompressed image or a next level LL subband. In the latter case, the next level LL subband is fed 1314 to an external memory 1330, which is then fed 1328 to the inverse DWT engine 1302. In a variation of this arrangement, the code blocks of the last level LL subband are fed to the inverse DWT engine via the code block manager 1306, and the subsequent lower level LL subbands are fed to the inverse DWT engine via the external memory 1330.

Preferably, the inverse DWT engine 1302 also operates in a pipeline fashion. This enables the code block manager 310 to buffer only a portion of the AC subbands at a time, thus minimising the need for a large buffer.

Figure 14:
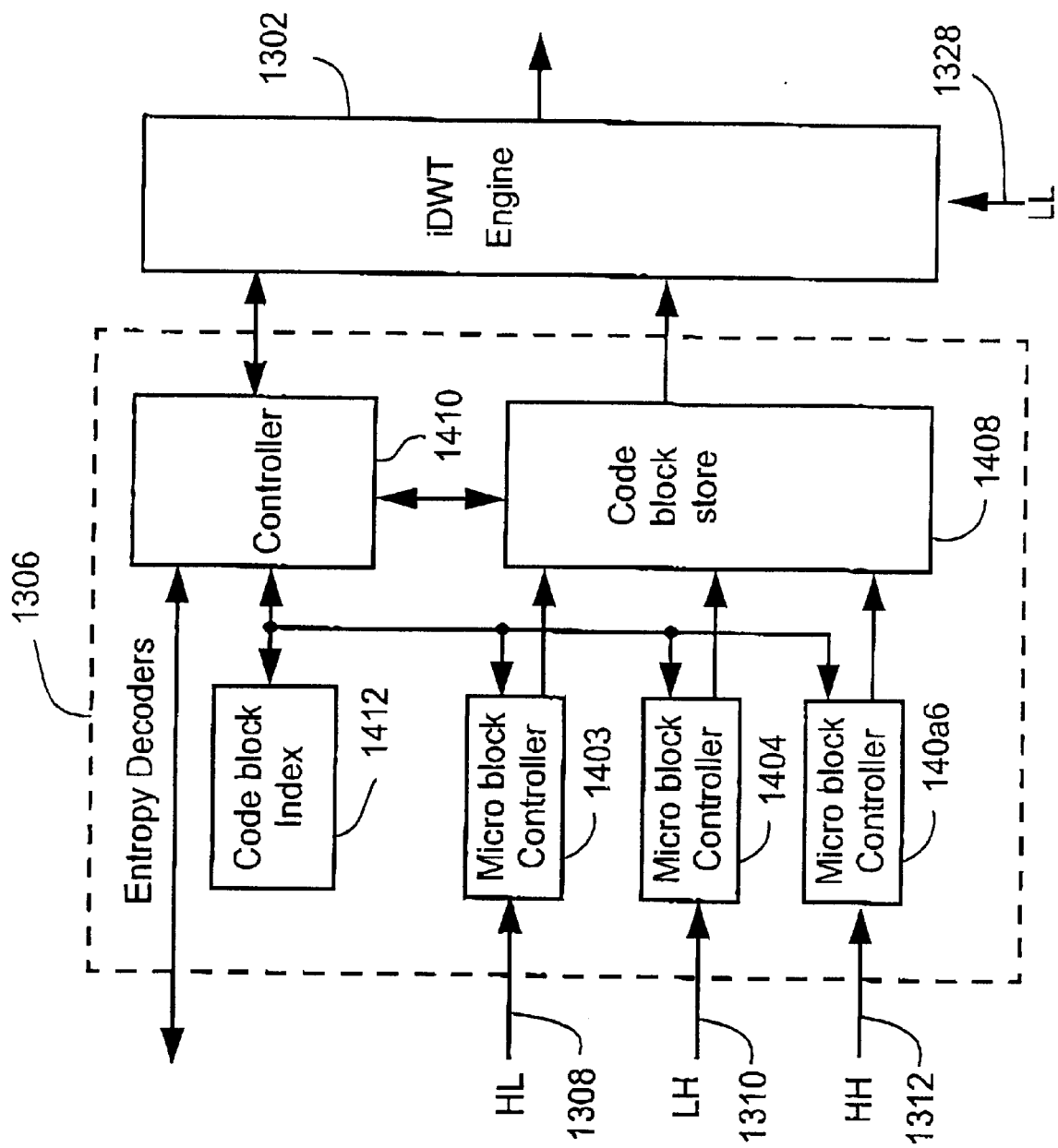
FIG. 14 shows in schematic form the code block manager and the inverse discrete wavelet transform engine of FIG. 13.

Turning now to FIG. 14, there is shown in schematic form the code block manager 1306 and the inverse discrete wavelet transform engine 1302 of FIG. 13. The code block manager 1306 has three data inputs 1308, 1310, and 1312 corresponding to the HL, LH, and HH subbands respectively. The entropy decoders 1304 feed respective code blocks of the AC subbands (HL, LH, and HH) to the respective data inputs 1308, 1310, and 1312. The code blocks are partitioned into micro blocks in a similar fashion to that shown in FIG. 5. The entropy decoders 1304 feed a code block of transform coefficients to the code block manager 1306 as a sequence of bit-planes beginning with the most significant bit-plane of the code block and continuing through to the predetermined minimum bit-plane of the code block. Within a code block bit-plane, the entropy decoders 1304 output a code block bit-plane as a sequence of bit-planes of micro blocks. Preferably, the entropy decoders 1304 output the bit-planes of the micro blocks in JPEG2000 strip scan order.

The code block manager 1306 comprises three micro block controllers 1403, 1404, 1406 coupled to data inputs 1308, 1310, and 1312, a code block store 1408, a controller 1410, and a code block index 1412. The controller 1410 is coupled to the three micro block controllers 1403, 1404, and 1406, the code block store 1408, the entropy decoders 1304, a code block index table 1410, and the inverse DWT engine 1302 for controlling the timing and operations of these devices. In particular, when a whole code block of coefficients are all present in the code block store 1408, the controller 1410 writes the entry of this code block in the code block store 1408 to a code block index table 1412. In this manner a code block index table 1412 is built of the stored code blocks, which are ready to be inverse discrete wavelet transformed. The code block index table 1412 maintains the code block store 1408 in a similar manner to the code block index table of FIG. 4 and will not be described any further.

The arrangements of FIG. 4 and FIG. 14 are substantially similar in that they divide the code blocks into micro-blocks and store the code blocks in the code block store 418, 1408 in substantially the same lossless semi-compressed format. However, in the arrangement 1300 the decoded first significant bit-plane in each micro block from the entropy decoders 1304 does not come out in raster order. Consequently, the semi-compressed format has to be modified slightly to cope with the random sequence of significant bit-plane output from the entropy decoders 1306. Thus, the micro-block controllers 1403, 1404, and 1406 for storing the semi-compressed coefficients in the code block store 1408 have to be modified slightly from the micro-block controllers 412, 414, and 416.

Figure 15B:
FIG. 15B shows a table corresponding to the example code block of FIG. 15A and depicting the order when the micro-blocks are first decoded.
Figure 15A:
FIG. 15A shows a table depicting an example code block divided into micro-blocks and the corresponding number of significant bit planes in each micro-block.

Turning now to FIG. 15A there is shown a table depicting an example code block 1500 divided into micro-blocks and the corresponding number of significant bit planes in each micro-block. Namely, FIG. 15A shows the number of bit planes from the most significant bit-plane of each micro-block to the predetermined minimum bit-plane. This example code block 1500 corresponds to the code block as shown in FIG. 6. An entropy decoder in accordance with JPEG2000 will decode the most significant bit-plane of the code block, then the next lower bit plane and so to a predetermined minimum bit plane. Preferably, the predetermined minimum bit-plane is the zero bit-plane.

Turning now to FIG. 15B, there is shown a table 1502 corresponding to the example code block 1500 of FIG. 15A and depicting the order when the micro-blocks are first decoded by the entropy decoders 1304. FIG. 15A shows the number of bit-planes in each micro block and the corresponding FIG. 15B shows the order of the most significant bit-planes of the micro blocks first being entropy decoded. The "X"s show the micro blocks which have no significant bit plane. As FIG. 15B illustrates it is not possible to predict the order of micro block being decoded. The microcontroller can only allocate the space in memory of the code block store 1408 for a micro block when it is first decoded. The bit-plane data for the micro blocks of the example code block 1500 are ordered in the code block store 1408 in the same order as shown in FIG. 15B.

Turning now to FIG. 16, there is shown the memory organisation of the example code block 1500 shown in FIG. 15A stored in the code block store 1408. For sake of clarity, only one code block is shown stored in the code block store 1408. The code block 1500 is stored as 32 bit words in the code block store 1408 commencing with a first word 1602 and terminating with a last word 1604. The example code block 1500 stored in the code block store 408 has a header structure 1606 comprising fifteen words followed by the micro-blocks of the code block 1500.

The example code block 1500 comprises a 32×32 array of coefficients arranged as 8×4 micro blocks each comprising 4×8 coefficients, where each bit-plane of a micro block comprises 32 bits. The number of significant bit-planes within each micro block is shown inside each micro block of the example code block 1500. These significant bit-planes comprising 32 bits are stored as respective 32 bit words in the code block store 1408. Similarly, the sign bit-planes of the micro blocks are stored as respective 32 bit words in the code block store 1408.

The bit-plane data of the micro-blocks 1608, 1610, 1612, 1614, . . . , 1616, 1618, . . . , 1620 are stored in sequence in the code block store 1408 following the header structure 1606. The micro-blocks of this example code block 1500 are ordered in the code block store 1408 in the order as shown in FIG. 15B. Namely, the micro-blocks are ordered in memory in the code block store 1408 corresponding to the sequence of the first significant bit-plane of the micro blocks first being entropy decoded. Where two micro-blocks have the same first significant bit-plane, the earlier micro-block in micro-block raster order is stored first. The header 1602 therefore has to provide an information about where the micro block is located in memory. This header structure 1602 will be described in more detail below. The memory organisation of the code block store 1408 differs from the memory organisation of the previously described code block store 418 only in the ordering of the micro-blocks and the header structure. This different ordering can be seen from a comparison of FIGS. 6 and 16 for the same example code block. Otherwise the semi-compressed format is the same.

For example, the second last micro block in raster scan order of the code block 1500 will be the first micro-block having bit-plane data which is first entropy decoded. The code block manager 1306 is able to calculate the space in memory required for this micro-block from the bit-plane number of this entropy decoded bit-plane. As this micro-block is the first micro-block being entropy decoded, the code block manager 1306 allocates this space 1608 in memory immediately following the header structure 1606. In this example, the code block manager 1306 allocates five words 1608 in memory for this micro-block. After the final completion of the entropy decoding of this micro-block, the code block store 1408 contains at location 1608 one word for storing its sign bits followed by the four significant bit-planes stored as four words. The last micro-block in raster scan order of the code block 1500 will be the next micro-block to be entropy decoded and thus the code block manager 1306 allocates space 1610 in memory immediately following the space 1608. In the latter case, four words 1610 are allocated in memory for this micro-block. Namely, one word is allocated for the sign bit-plane data and three words are allocated for the three significant bit-plane data for this micro-block. The code block manager continues in this fashion until all micro-blocks are stored in the code block store 1408.

Turning now to FIG. 17, there is shown a table of the header structure of a code block for use in the arrangement 1300 described with reference to example code block 1500 shown in FIG. 15A. The words 0 to 15 each consist of 32 bits and each store information concerning two micro-blocks. Word 0 stores information concerning micro-blocks 1 and 2 in raster scan order. Word 1 stores information concerning micro-blocks 3 and 4 in raster scan order and so on. Lastly, Word 15 stores information concerning micro-blocks 31 and 32 in raster scan order. The number of bit-planes and the offset to the header for each micro block is recorded in the corresponding word of the header. The offset is generated and space is reserved in memory of the code block store 1408 when the first significant bit-plane of a micro-block is decoded. The space (number of words) required for a micro block is the number of bit-planes plus 1(sign). The offset for an insignificant micro block is marked with "X", as it will not be used. The maximum number of bit-planes of a whole code block is not required for the iDWT engine 1302 and as a result it is not recorded in the first word. Turning now to FIG. 15A, an explanation of this header structure is given with respect to the thirty-first micro-block in raster scan order. This micro-block comprises four significant bit-planes and is the first micro-block to be decoded. Consequently the bit-plane data of this micro-block will immediately follow the header structure in memory of the code block store 1408. As the header structure comprises 16 words, the offset of this micro-block is 16 words. The information concerning the number of bit-planes and offset for this micro-block is stored in word 15 of the header structure.

It will be apparent that the encoding by the arrangement 1300 to produce the above mentioned lossless compressed format is in effect a nominal encoding. This nominal encoding extracts the significant micro block bit planes from the entropy decoded bit planes of the code block as is and stores information concerning the insignificant micro bit planes in the header. There are many different ways to produce this lossless compressed format from the entropy decoded bit planes of the code block.

The iDWT engine 1302 comprises a decoder for decompressing the semi-compressed coefficients stored in the code block store 1408 utilising the header information stored in the code block store 1408 and the corresponding bit-plane data. The decoder of the iDWT engine utilises the header information stored in the code block store 1408 to retrieve the bit-plane data of a required micro-block. Preferably, the decoder will load all the bit plane data of a micro-block and reconstitutes all the coefficients within the micro-block from that bit-plane data. The iDWT engine 1302 preferably synthesises the code blocks in micro-block raster order, and preferably only one 8×4 uncompressed memory micro-block store is needed for each subband.

As mentioned above, the preferred arrangements are asynchronous in nature. Alternatively, the arrangement may be adapted to be synchronous in nature without departing from the spirit or scope of the invention.

The arrangements 300 and 1300 use of lossless compressed code blocks reduces the memory requirements, or allows the storage of more code block data in a given amount of memory, for buffering between the DWT (entropy decoder) and entropy coder (inverse DWT). Preferably, the lossless compression technique achieves compression by representing those bit-planes above the bit-plane that contains the most significant bit of the micro block in a compact form. Preferably, this is achieved by encoding the most significant bit-plane number in a header. Then the remaining significant bit-planes, and a sign bit plane, are represented as is to form the compressed micro-block. In this way the leading zeros (the zero bit symbols of those bit-planes above the bit-plane that contains the most significant bit of the micro block) of a micro block are efficiently compressed.

Significant compression is achieved in the preferred arrangement since the number of bit-planes above the bit-plane that contains the most significant bit of the micro block can vary substantially between micro blocks and particularly between code blocks from different subbands. When the micro blocks compress more, there are more micro blocks and hence code blocks in the code block store. This will typically be the case for level 1 subband code blocks, which constitute approximately more than three quarters of the total number of DWT transform coefficients. Typically in this case, the entropy coders will consume code blocks quickly, as there will be fewer symbols to encode, so it is preferable to have many code blocks in the code block store. Conversely, when the micro blocks are less compressible there will be fewer code blocks in the code block store while at the same time the entropy coders will be consuming code blocks more slowly. The code block store thus utilises a fixed amount of memory more efficiently than a fixed bit-depth representation that can handle code blocks from all subbands. Other ways of compressing the leading zeros of a micro block or code block are possible.

Figure 18:
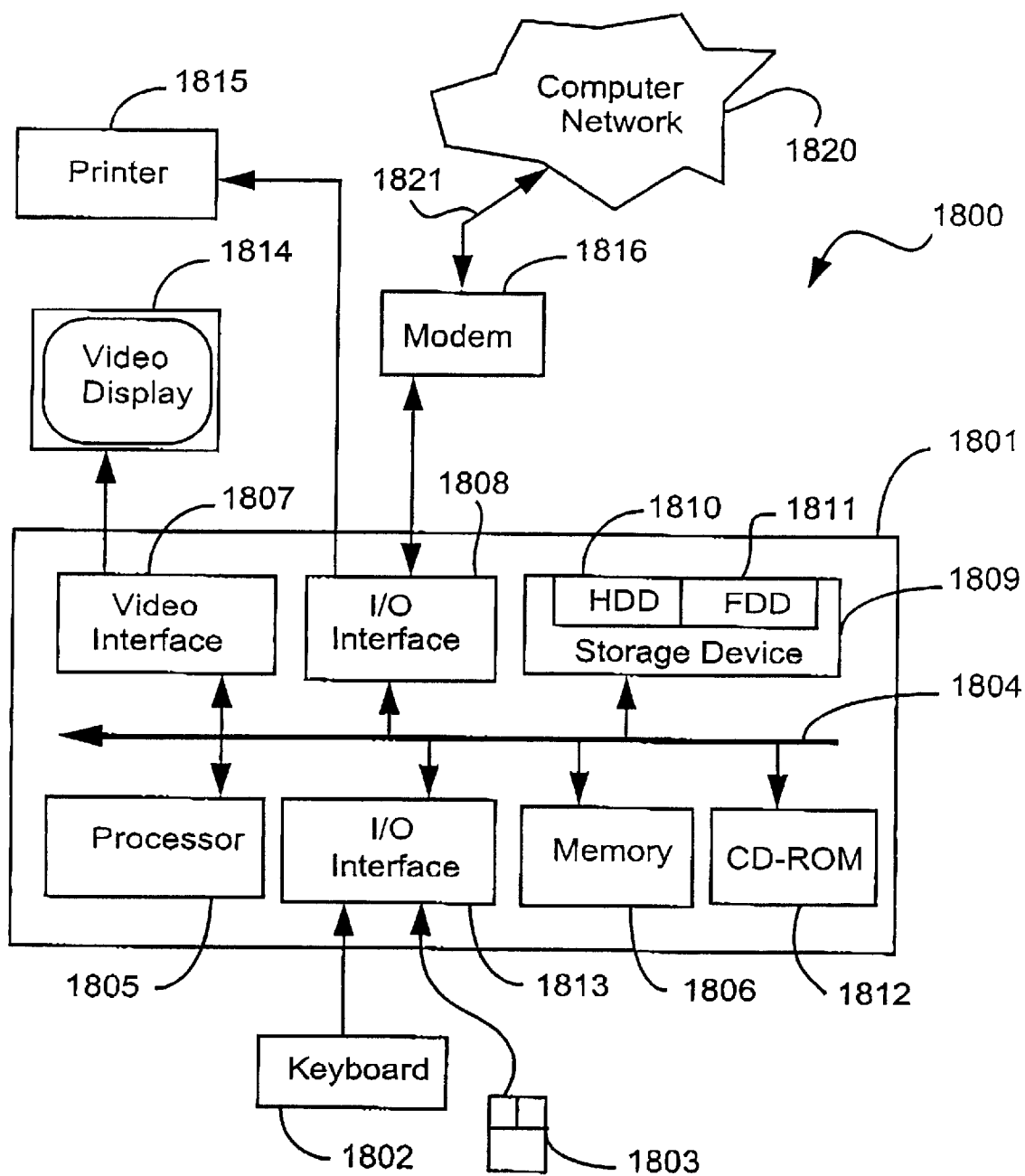
FIG. 18 shows a general-purpose computer.

The preferred arrangements described with reference to FIG. 3 and FIG. 13 can alternatively be implemented as software or as a software component of another application, for execution on a general purpose computer 1800 such as that shown in FIG. 18.

Other software applications that use buffering of the lossless compressed code blocks are possible, particularly where there are many code blocks that require buffering. This could be the case in certain implementations of a JPEG2000 encoder (decoder) which buffer many code blocks before entropy coding (inverse DWT transforming). In another case, in a networked environment, decoded code blocks may be used at different times by different inverse DWT procedures, and thus need to be buffered. The buffering of the lossless compressed code blocks in such a networked environment will enable fast compression and decompression. Furthermore, the buffering of a lossless compression of leading zeroes enables the software to undertake the lossless compression (lossless decompression) for the encoder (decoder) while doing the DWT (inverse DWT), with only a relatively insignificant impact on the speed of the DWT (inverse DWT).

Other ways of compressing the leading zeroes of a micro block or code block are possible. For example a quad-tree (or tag tree as used in JPEG2000) representation of the data could be used in a software application for compression of the leading zeros in a hierarchical fashion.

The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects the preferred arrangements of FIGS. 3 to 12 or 13 to 17.

The computer system 1800 comprises a computer module 1801, input devices such as a keyboard 1802 and mouse 1803, output devices including a printer 1815 and a display device 1814. A Modulator-Demodulator (Modem) transceiver device 1816 is used by the computer module 1801 for communicating to and from a communications network 1820, for example connectable via a telephone line 1821 or other functional medium. The modem 1816 can be used to obtain access to the Internet, and other network systems, such as a Local Area Network (LAN) or a Wide Area Network (WAN).

The computer module 1801 typically includes at least one processor unit 1805, a memory unit 1806, for example formed from semiconductor random access memory (RAM) and read only memory (ROM), input/output (I/O) interfaces including a video interface 1807, and an I/O interface 1813 for the keyboard 1802 and mouse 1803 and optionally a joystick (not illustrated), and an interface 1808 for the modem 1816. A storage device 1809 is provided and typically includes a hard disk drive 1810 and a floppy disk drive 1811. A magnetic tape drive (not illustrated) may also be used. A CD-ROM drive 1812 is typically provided as a non-volatile source of data. The components 1805 to 1813 of the computer module 1801, typically communicate via an interconnected bus 1804 and in a manner, which results in a conventional mode of operation of the computer system 1800 known to those in the relevant art. Examples of computers on which the described arrangements can be practised include IBM-PC's and compatibles, Sun Sparostations or alike computer systems evolved therefrom.

Typically, the application program is resident on the hard disk drive 1810 and read and controlled in its execution by the processor 1805. Intermediate storage of the program and any data fetched from the network 1820 may be accomplished using the semiconductor memory 1806, possibly in concert with the hard disk drive 1810. In some instances, the application program may be supplied to the user encoded on a CD-ROM or floppy disk and read via the corresponding drive 1812 or 1811, or alternatively may be read by the user from the network 1820 via the modem device 1816. Still further, the software can also be loaded into the computer system 1800 from other computer readable medium including magnetic tape, a ROM or integrated circuit, a magneto-optical disk, a radio or infra-red transmission channel between the computer module 1801 and another device, a computer readable card such as a PCMCIA card, and the Internet and Intranets including email transmissions and information recorded on websites and the like. The foregoing is merely exemplary of relevant computer readable mediums. Other computer readable media may alternately be used.

INDUSTRIAL APPLICABILITY

It is apparent from the above that the arrangements described are applicable to the image processing industries.

The foregoing describes only some embodiments of the present invention, and modifications and/or changes can be made thereto without departing from the scope and spirit of the invention, the embodiment(s) being illustrative and not restrictive.

We claim:

1. A method of storing a block of transform coefficients in a buffer between a transformer and at least one coder, the method comprising the steps of:
    re-arranging said block of transform coefficients into one or more sub-blocks of transform coefficients;
    generating a lossless compressed representation of the block of transform coefficients for the purposes of reducing storage, wherein the lossless compression technique achieves compression by representing those bit-planes above the most significant bit-planes of the respective sub-blocks in a compact form; and
    storing said lossless compressed representation in said buffer.

2. The method as claimed in claim 1, wherein the block of transform coefficients comprises a predetermined number of bit-planes and the lossless compressed representation comprises data associated with each sub-block indicating the number of significant bit-planes in the associated sub-block.

3. The method as claimed in claim 2, wherein the lossless compressed representation further comprises bit symbols from the respective bitplanes of each sub-block arranged in bit-plane order from each sub-block's most significant bit-plane to a predetermined minimum bit-plane.

4. The method as claimed in claim 2, wherein said lossless compressed representation further comprises sign bit-plane data of said transform coefficients of said block.

5. The method as claimed in claim 1, wherein said transformer is a forward transformer and said coder is an encoder.

6. The method as claimed in claim 1, wherein said transformer is an inverse transformer and said coder is a decoder.

7. A method of coding a code block of transform coefficients, wherein the code block comprises a predetermined number of bit-planes and the method comprises the steps of:
    re-arranging the code block of transform coefficients into one or more sub-blocks of transform coefficients;
    generating groups of bit symbols, wherein the bit symbols of the groups correspond to bit symbols of respective significant bitplanes of the sub-blocks;
    generating data corresponding to each sub-block indicating the number of significant bit-planes in the corresponding sub-block;
    storing the groups of bit symbols and the generated data in a buffer;
    retrieving from the buffer said groups of bit symbols and generated data;
    reconstituting the bitplanes of the code block from its most significant bitplane to the predetermined minimum bitplane utilising corresponding said groups of bit symbols and said generated data; and bit-plane encoding the reconstituted bitplanes of the code block of transform coefficients.

8. The method as claimed in claim 7, wherein if there is not a most significant bit-plane for a said sub-block then no said groups of bit symbols are stored in said buffer for the sub-block.

9. The method as claimed in claim 7, wherein said code block comprises a sign bit-plane and said sub-blocks comprise corresponding sign bit-planes, and wherein the step of generating the group of bit symbols comprises the sub-step of:

generating groups of sign bit symbols, wherein the sign bit symbols of the groups correspond to sign bit symbols of the sign bitplanes of the sub-blocks.

10. The method as claimed in claim 7, wherein the stored groups of bit symbols are stored contiguously in said buffer in a predetermined order.

11. The method as claimed in claim 10, wherein said stored groups of bit symbols are stored immediately following a header that comprises said data.

12. The method as claimed in claim 7, wherein if there are no groups of bit symbols stored in said buffer for a said sub-block said corresponding data from that sub-block indicates that the number of groups of bit symbols stored in the buffer for that sub-block is zero.

13. The method as claimed in claim 7, wherein said data further comprises information indicating the number of significant bit-planes in the code block overall.

14. A method of decoding a bit-plane encoded code block of transform coefficients, the method comprises the steps of:

bit-plane decoding said encoded code block from a most significant bit-plane to a predetermined minimum bit-plane of the code block;

re-arranging the decoded code block into one or more sub-blocks of bitplanes;

generating groups of bit symbols, wherein the bit symbols of the groups correspond to bit symbols of respective significant bitplanes of the sub-blocks;

generating data corresponding to each sub-block indicating the number of significant bit-planes in the corresponding sub-block;

storing the groups of bit symbols and the generated data in a buffer;

retrieving from the buffer said groups of bit symbols and generated data; and reconstituting the bitplanes of the code block utilising corresponding said groups of bit symbols and said generated data.

15. The method as claimed in claim 14, wherein if there is not a most significant bit-plane for a said sub-block then no said groups of bit symbols are stored in said buffer for the sub-block.

16. The method as claimed in claim 14, wherein said code block comprises a sign bit-plane and said sub-blocks comprise corresponding sign bit-planes, and wherein the step of generating the group of bit symbols comprises the sub-step of:

generating groups of sign bit symbols, wherein the sign bit symbols of the groups correspond to sign bit symbols of the sign bitplanes of the sub-blocks.

17. The method as claimed in claim 14, wherein the stored groups of bit symbols are stored contiguously in said buffer in a predetermined order.

18. The method as claimed in claim 17, wherein said groups of bit symbols are stored immediately following a header that comprises said data.

19. The method as claimed in claim 14, wherein if there are no groups of bit symbols stored in said buffer for a said sub-block said corresponding data for that sub-block indicates that the number of groups of bit symbols stored in the buffer for that sub-block is zero.

20. The method as claimed in claim 14, wherein said data further comprises information indicating the number of significant bit-planes in the code block overall.

21. Apparatus for storing a block of transform coefficients in a buffer between a transformer and at least one coder, the apparatus comprising:

a controller for re-arranging said block of transform coefficients into one or more sub-blocks of transform coefficients and generating a lossless compressed representation of the block of transform coefficients for the purposes of reducing storage, wherein the lossless compression technique achieves compression by representing those bit-planes above the most significant bit-planes of the respective sub-blocks in a compact form.

22. The apparatus as claimed in claim 21, wherein the block of transform coefficients comprises a predetermined number of bit-planes and the lossless compressed representation comprises data associated with each sub-block indicating the number of significant bit-planes in the associated sub-block.

23. The apparatus as claimed in claim 22, wherein the lossless compressed representation further comprises bit symbols from the respective bitplanes of each sub-block arranged in bit-plane order from each sub-block's most significant bit-plane to a predetermined minimum bit-plane.

24. The apparatus as claimed in claim 22, wherein said lossless compressed representation further comprises sign bit-plane data of said transform coefficients of said block.

25. The apparatus as claimed in claim 21, wherein said transformer is a forward transformer and said coder is an encoder.

26. The apparatus as claimed in claim 21, wherein said transformer is an inverse transformer and said coder is a decoder.

27. Apparatus for coding a code block of transform coefficients, wherein the code block comprises a predetermined number of bit-planes and the apparatus comprises:

a module for re-arranging the code block of transform coefficients into one or more sub-blocks of transform coefficients, a controller for generating groups of bit symbols wherein the bit symbols of the groups correspond to bit symbols of respective significant bitplanes of the sub-blocks, and for generating data corresponding to each sub-block indicating the number of significant bit-planes in the corresponding sub-block;

a buffer for storing the groups of bit symbols and the generated data;

a decoder for retrieving from the buffer said groups of bit symbols and generated data, and reconstituting the bitplanes of the code block from its most significant bitplane to the predetermined minimum bitplane utilising the corresponding said groups of bit symbols and said generated data; and a bit-plane encoder for encoding the reconstituted bitplanes of the code block of transform coefficients.

28. The apparatus as claimed in claim 27, wherein if there is not a most significant bit-plane for a said sub-block then no said groups of bit symbols are stored in said buffer for the sub-block.

29. The apparatus as claimed in claim 27, wherein said code block comprises a sign bit-plane and said sub-blocks comprise corresponding sign bit-planes, and said controller generates groups of sign bit symbols, wherein the sign bit symbols of the groups correspond to sign bit symbols of the sign bitplanes of the sub-blocks.

30. The apparatus as claimed in claim 27, wherein the stored groups of bit symbols are stored contiguously in said buffer in a predetermined order.

31. The apparatus as claimed in claim 30, wherein said stored groups of bit symbols are stored immediately following a header that comprises said data.

32. The apparatus as claimed in claim 27, wherein if there are no groups of bit symbols stored in said buffer for a said sub-block said corresponding data for that sub-block indicates that the number of groups of bit symbols stored in the buffer for that sub-block is zero.

33. The apparatus as claimed in claim 27, wherein said data further comprises information indicating the number of significant bit-planes in the code block overall.

34. The apparatus as claimed in claim 27, wherein said bit-plane encoder comprises multiple bit-plane encoders, which can work independently of each other.

35. Apparatus for decoding a bit-plane encoded code block of transform coefficients, the apparatus comprising:
    a bit-plane decoder for bit-plane decoding said encoded code block from a most significant bit-plane to a predetermined minimum bit-plane of the code block;
    a module for re-arranging the decoded code block into one or more sub-blocks of bitplanes;
    a controller for generating groups of bit symbols wherein the bit symbols of the groups correspond to bit symbols of respective significant bitplanes of the sub-blocks, and for generating data corresponding to each sub-block indicating the number of significant bit-planes in the corresponding sub-block;
    a buffer for storing the groups of bit symbols and the generated data;
    a decoder for retrieving from the buffer said groups of bit symbols and generated data, and for reconstituting the bitplanes of the code block utilising corresponding said groups of bit symbols and said generated data.

36. The apparatus as claimed in claim 35, wherein if there is not a most significant bit-plane for a said sub-block then no said groups of bit symbols are stored in said buffer for the sub-block.

37. The apparatus as claimed in claim 35, wherein said code block comprises a sign bit-plane and said sub-blocks comprise corresponding sign bit-planes, and said controller generates groups of sign bit symbols, wherein the sign bit symbols of the groups correspond to sign bit symbols of the sign bitplanes of the sub-blocks.

38. The apparatus as claimed in claim 35, wherein the stored groups of bit symbols are stored contiguously in said buffer in a predetermined order.

39. The apparatus as claimed in claim 38, wherein said stored groups of bit symbols are stored immediately following a header that comprises said data.

40. The apparatus as claimed in claim 35, wherein if there are no groups of bit symbols stored in said buffer for a said sub-block said corresponding data for that sub-block indicates that the number of groups of bit symbols stored in the buffer for that sub-block is zero.

41. The apparatus as claimed in claim 35, wherein said data further comprises information indicating the number of significant bit-planes in the code block overall.

42. The apparatus as claimed in claim 35, wherein said bit-plane decoder comprises multiple bit-plane decoders, which can work independently of each other.

43. A computer program for storing a block of transform coefficients in a buffer prior to encoding, the computer program comprising:
    code for re-arranging said block of transform coefficients into one or more sub-blocks of transform coefficients;
    code for generating a lossless compressed representation of the block of transform coefficients for the purposes of reducing storage, wherein the lossless compression technique achieves compression by representing those bit-planes above the most significant bit-planes of the respective sub-blocks in a compact form; and
    code for storing said lossless compressed representation in said buffer.

44. A computer program for coding a code block of transform coefficients, wherein the code block comprises a predetermined number of bit-planes and the computer program comprises:
    code for re-arranging the code block of transform coefficients into one or more sub-blocks of transform coefficients;
    code for generating groups of bit symbols, wherein the bit symbols of the groups correspond to bit symbols of respective significant bitplanes of the sub-blocks;
    code for generating data corresponding to each sub-block indicating the number of significant bit-planes in the corresponding sub-block;
    code for storing the groups of bit symbols and the generated data in a buffer;
    code for retrieving from the buffer said groups of bit symbols and generated data;
    code for reconstituting the bitplanes of the code block from its most significant bitplane to a predetermined minimum bitplane utilising corresponding said groups of bit symbols and said generated data; and
    code for bit-plane encoding the reconstituted bitplanes of the code block of transform coefficients.

45. A computer program for decoding a bit-plane encoded code block of transform coefficients, the computer program comprising:
    code for bit-plane decoding said encoded code block from a most significant bit-plane to a predetermined minimum bit-plane of the code block;
    code for re-arranging the decoded code block into one or more sub-blocks of bitplanes;
    code for generating groups of bit symbols, wherein the bit symbols of the groups correspond to bit symbols of respective significant bitplanes of the sub-blocks;
    code for generating data corresponding to each sub-block indicating the number of significant bit-planes in the corresponding sub-block;
    code for storing the groups of bit symbols and the generated data in a buffer;
    retrieving from the buffer said groups of bit symbols and generated data; and
    code for reconstituting the bitplanes of the code block utilising corresponding said groups of bit symbols and said generated data.

* * * * *

UNITED STATES PATENT AND TRADEMARK OFFICE
CERTIFICATE OF CORRECTION

PATENT NO. : 6,570,510 B2  Page 1 of 1
APPLICATION NO. : 10/003098
DATED : May 27, 2003
INVENTOR(S) : Yu-Ling Chen et al.

It is certified that error appears in the above-identified patent and that said Letters Patent is hereby corrected as shown below:

COLUMN 1

Line 27, "herein after" should read --hereinafter--.

COLUMN 3

Line 12, "comprising" should read --comprising:--.

COLUMN 8

Line 3, "nous." should read --nously.--.

COLUMN 22

Line 65, "the" should read --a--.

COLUMN 23

Line 66, "groups" should read --stored groups--.

COLUMN 24

Line 58, "the" should read --a--.

Signed and Sealed this

Twentieth Day of January, 2009

JON W. DUDAS
*Director of the United States Patent and Trademark Office*